United States Patent
John Wilson et al.

(10) Patent No.: US 11,240,841 B2
(45) Date of Patent: Feb. 1, 2022

(54) DEFAULT COMMUNICATION CONFIGURATION FOR COMMUNICATION ACROSS CARRIERS

(71) Applicant: QUALCOMM Incorporated, San Diego, CA (US)

(72) Inventors: Makesh Pravin John Wilson, San Diego, CA (US); Tao Luo, San Diego, CA (US); Yan Zhou, San Diego, CA (US); Heechoon Lee, San Diego, CA (US); Peter Pui Lok Ang, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 16/534,675

(22) Filed: Aug. 7, 2019

(65) Prior Publication Data
US 2020/0053776 A1    Feb. 13, 2020

Related U.S. Application Data

(60) Provisional application No. 62/717,762, filed on Aug. 10, 2018.

(51) Int. Cl.
*H04W 74/08* (2009.01)
*H04W 56/00* (2009.01)
(Continued)

(52) U.S. Cl.
CPC ....... *H04W 74/0808* (2013.01); *H04W 16/14* (2013.01); *H04W 56/0035* (2013.01); *H04W 72/1294* (2013.01)

(58) Field of Classification Search
CPC .......... H04J 11/00; H04L 1/1861; H04L 5/00; H04L 5/001; H04L 5/005; H04L 5/0053;
(Continued)

(56) References Cited

U.S. PATENT DOCUMENTS

| | | | |
|---|---|---|---|
| 9,614,653 B2* | 4/2017 | Kim | H04L 27/2675 |
| 2015/0341882 A1* | 11/2015 | Davydov | H04W 72/005 |
| | | | 370/336 |
| 2019/0239093 A1 | 8/2019 | Zhang et al. | |

OTHER PUBLICATIONS

Asustek: "Remaining Issues on Beam Management", 3GPP Draft; R1-1807210 Remaining Issues on Beam Management, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018 May 20, 2018, XP051442406, Retrieved from the Internet: URL:http://www.3gpp.org/ftp/Meetings%5F3GPP%5FSYNC/RAN1/Docs/ [retrieved on May 20, 2018], 9 pages.

(Continued)

*Primary Examiner* — Marsha D Banks Harold
*Assistant Examiner* — Dharmesh J Patel
(74) *Attorney, Agent, or Firm* — Loza & Loza LLP

(57) ABSTRACT

Various aspects of the disclosure relate to use of a default communication configuration for cross carrier wireless communication. For example, a wireless communication device such as a user equipment (UE) may use a default communication configuration that includes quasi-colocation information (e.g., a default CORESET configuration) for communication on a secondary component carrier (SCC). The default communication configuration may be used, for example, in scenarios where a CORESET is not defined for the SCC and other configuration information is not available. For example, other configuration information might not be available due to a short time gap between a grant sent (Continued)

on a primary component carrier (PCC) and the communication on the SCC scheduled by the grant.

29 Claims, 17 Drawing Sheets

(51) Int. Cl.
*H04W 72/12* (2009.01)
*H04W 16/14* (2009.01)

(58) Field of Classification Search
CPC ........... H04L 27/2657; H04L 27/2675; H04W 16/14; H04W 56/0035; H04W 72/04; H04W 72/1294; H04W 74/0808
See application file for complete search history.

(56) References Cited

OTHER PUBLICATIONS

Ericsson: "Feature Lead Summary 3 for Beam Measurement and Reporting", 3GPP Draft; R1-1807782 Feature Lead Summary 3 for Beam Measurement and Reporting, 3rd Generation Partnership Project (3GPP), Mobile Competence Centre; 650, Route Des Lucioles; F-06921 Sophia-Antipolis Cedex; France, vol. RAN WG1, No. Busan; May 21, 2018-May 25, 2018 May 29, 2018, XP051463494, Retrieved from the Internet: URL:http://www.3gpp.org/ftp/tsg%5Fran/WG1%5FRL1/TSGR1%5F93/Docs [retrieved on May 29, 2018], 41 pages.
International Search Report and Written Opinion—PCT/US2019/045717—ISA/EPO—dated Oct. 22, 2019.

\* cited by examiner

DEFAULT COMMUNICATION CONFIGURATION FOR COMMUNICATION ACROSS CARRIERS

CROSS-REFERENCE TO RELATED APPLICATION(S)

This application claims priority to and the benefit of provisional patent application No. 62/717,762 filed in the U.S. Patent and Trademark Office on Aug. 10, 2018, the entire content of which is incorporated herein by reference.

INTRODUCTION

Various aspects described herein relate to wireless communication and, more particularly but not exclusively, to use of a default communication configuration for wireless communication across carriers.

Some types of wireless communication devices use beamforming to provide a desired level of performance. One example of such a device is a wireless multiple-in-multiple-out (MIMO) system where a transmitting device (e.g., a base station) uses multiple antennas to send beamformed signals to a receiving device (e.g., a user equipment) which can have one or more antennas. Here, the transmitted beamformed signals may be adjusted in phase (and, optionally, amplitude) such that the resulting signal power is focused toward the receiving device. Another example of a device that may use beamforming is a millimeter wave (mmW) device that can send and receive beamformed signals at mmW frequencies (e.g., in the range of 30 GHz, 60 GHz, etc.).

Since beamformed communication may use relatively narrow beams, changes in the operating environment such a movement of a device, a change in a channel condition, interference from a nearby device, or the presence of a structure that blocks a beam may necessitate that the transmitting device and/or the receiving device switch to a different beam.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a processing circuit and an interface coupled to the processing circuit. The processing circuit is configured to: determine a default communication configuration comprising quasi-colocation information for a first carrier, send the default communication configuration to another apparatus via the interface, send a scheduling indication for the first carrier to the other apparatus via a second carrier, determine another communication configuration based on the default communication configuration, and communicate information via the first carrier according to the scheduling indication, wherein the communication of the information is based on the other communication configuration.

In one aspect, the disclosure provides a method of communication for an apparatus. The method includes: determining a default communication configuration comprising quasi-colocation information for a first carrier; sending the default communication configuration to another apparatus; sending a scheduling indication for the first carrier to the other apparatus via a second carrier; determining another communication configuration based on the default communication configuration; and communicating information via the first carrier according to the scheduling indication, wherein the communication of the information is based on the other communication configuration.

In one aspect, the disclosure provides an apparatus configured for communication. The apparatus includes: means for determining a default communication configuration comprising quasi-colocation information for a first carrier; means for sending the default communication configuration to another apparatus; means for sending a scheduling indication for the first carrier to the other apparatus via a second carrier; means for determining another communication configuration based on the default communication configuration; and means for communicating information via the first carrier according to the scheduling indication, wherein the communication of the information is based on the other communication configuration.

In one aspect, the disclosure provides a non-transitory computer-readable medium storing computer-executable code, including code to: determine a default communication configuration comprising quasi-colocation information for a first carrier; send the default communication configuration to another apparatus; send a scheduling indication for the first carrier to the other apparatus via a second carrier; determine another communication configuration based on the default communication configuration; and communicate information via the first carrier according to the scheduling indication, wherein the communication of the information is based on the other communication configuration.

In one aspect, the disclosure provides an apparatus configured for communication that includes a processing circuit and an interface coupled to the processing circuit. The processing circuit is configured to: receive a default communication configuration comprising quasi-colocation information for a first carrier from another apparatus via the interface, receive a scheduling indication for the first carrier from the other apparatus via a second carrier, determine that no control resource set is defined for the first carrier, elect to use the default communication configuration for communication based on the scheduling indication as a result of the determination that no control resource set is defined for the first carrier, and communicate information via the first carrier according to the scheduling indication, wherein the communication of the information is based on the default communication configuration.

In one aspect, the disclosure provides a method of communication for an apparatus. The method includes: receiving a default communication configuration comprising quasi-colocation information for a first carrier from another apparatus; receiving a scheduling indication for the first carrier from the other apparatus via a second carrier; determining that no control resource set is defined for the first carrier; electing to use the default communication configuration for communication based on the scheduling indication as a result of the determination that no control resource set is defined for the first carrier; and communicating information via the first carrier according to the scheduling indication, wherein the communication of the information is based on the default communication configuration.

In one aspect, the disclosure provides an apparatus configured for communication. The apparatus includes: means for receiving a default communication configuration comprising quasi-colocation information for a first carrier from another apparatus; means for receiving a scheduling indication for the first carrier from the other apparatus via a second carrier; means for determining that no control resource set is defined for the first carrier; means for electing to use the default communication configuration for communication based on the scheduling indication as a result of the determination that no control resource set is defined for the first carrier; and means for communicating information via the first carrier according to the scheduling indication, wherein the communication of the information is based on the default communication configuration.

In one aspect, the disclosure provides a non-transitory computer-readable medium storing computer-executable code, including code to: receive a default communication configuration comprising quasi-colocation information for a first carrier from another apparatus; receive a scheduling indication for the first carrier from the other apparatus via a second carrier; determine that no control resource set is defined for the first carrier; elect to use the default communication configuration for communication based on the scheduling indication as a result of the determination that no control resource set is defined for the first carrier; and communicate information via the first carrier according to the scheduling indication, wherein the communication of the information is based on the default communication configuration.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
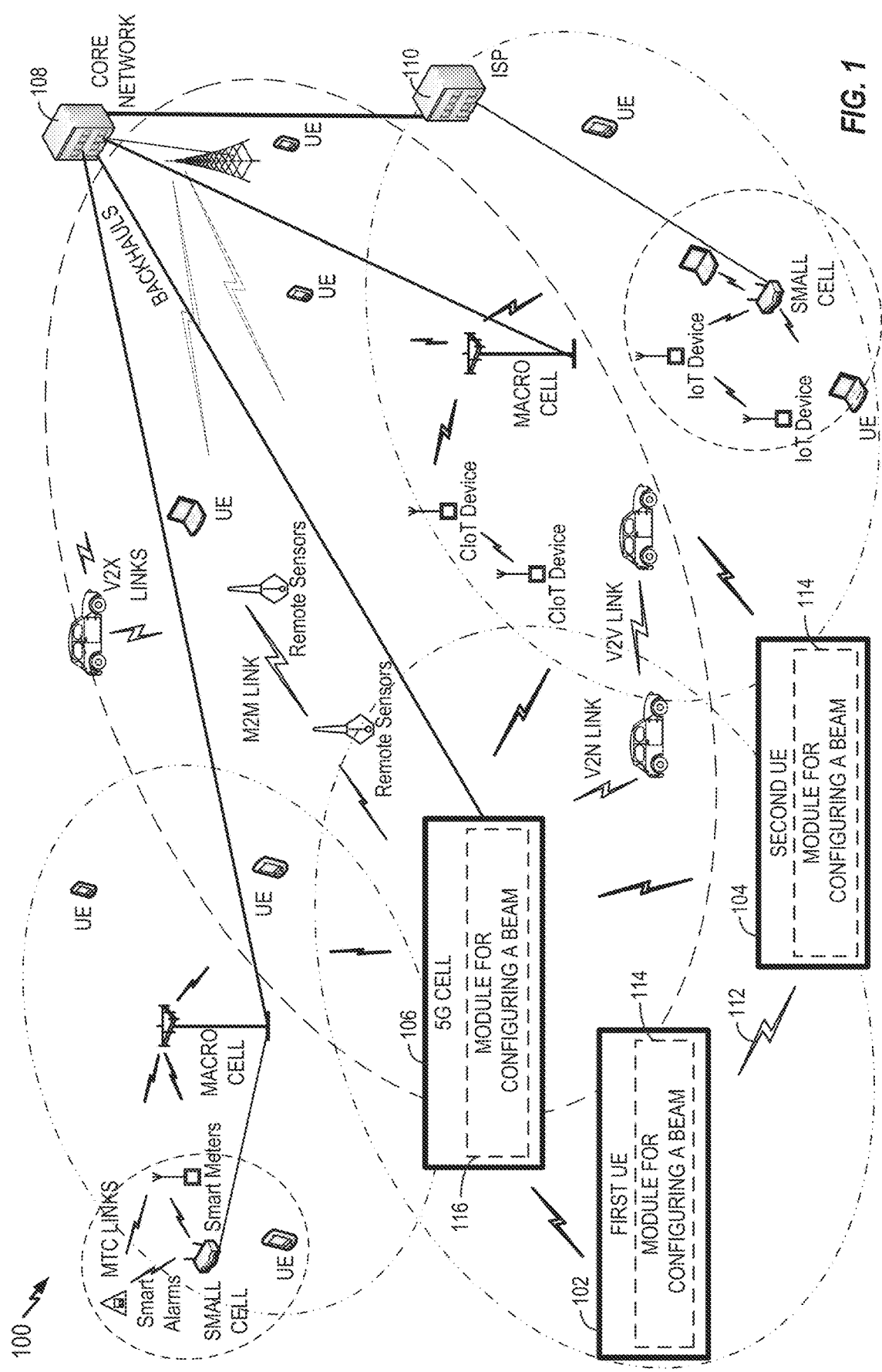
FIG. 1 is a block diagram illustrating an example communication system within which aspects of the disclosure may be implemented.

Various aspects of the disclosure relate to use of a default communication configuration for cross carrier wireless communication. For example, a wireless communication device such as a user equipment (UE) may use a default communication configuration that may include quasi-colocation information (e.g., a default CORESET configuration) for communication on a secondary component carrier (SCC). The default communication configuration may be used, for example, in scenarios where a CORESET is not defined for the SCC and other configuration information is not available. For example, other configuration information might not be available due to a short time gap between a grant sent on a primary component carrier (PCC) and a transmission on the SCC scheduled by the grant. Thus, the disclosure relates in some aspects to techniques for devices to determine which beam configuration to use for communication.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a 5G cell 106 (e.g., a gNB) using wireless communication resources managed by the 5G cell 106 and/or other network components (e.g., a core network 108, an internet service provider (ISP) 110, peer devices, and so on). In some implementations, one or more of the components of the system 100 may communicate with each other directly via a device-to-device (D2D) link 112 or some other similar type of direct link.

Communication of information between two or more of the components of the system 100 may involve sending downlink information, uplink information, or the like via beamformed communication. For example, the 5G cell 106 may send downlink information to the UE 102 and/or the UE 104 via beamformed communication. In accordance with the teachings herein, one or more of the UE 102, the UE 104, or some other component of the system 100 may include a module for configuring a beam 114. In accordance with the teachings herein, one or more of the 5G cell 106, or some other component of the system 100 may include a module for configuring a beam 116. Example functionality of these modules (e.g., relating to determining a communication configuration) is described below.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, vehicle-to-anything (V2X) links, and cellular V2X (CV2X) links Network-to-device links may include, without limitation, uplinks (or reverse links), downlinks (or forward links), and vehicle-to-network (V2N) links Transmission Configuration Indication In a 3rd Generation Partnership Project (3GPP) communication system, a network may send Downlink Control Information (DCI) to a user equipment (UE) via a downlink (DL) control channel (e.g., a Physical Downlink Control Channel (PDCCH)) to schedule a DL transmission (e.g., a Physical Downlink Shared Channel (PDSCH) transmission) to the UE. In some cases, the DCI may include a Transmission Configuration Indication (TCI) that includes, for example, information about the beam that will be used for the transmission. This can be indicated, for example, by a tci-PresentInDCI flag in the UE configuration.

A TCI state associated with a transmission/channel provides quasi-colocation (QCL) information about the antenna ports a base station (BS) uses for the transmission. This QCL information may therefore include information indicative of the beam the UE may use to decode the transmission. If the DCI includes a TCI, the UE may use the beam configuration specified by the TCI or the UE may use a default beam configuration in certain scenarios as discussed below.

Default Configuration

In some scenarios, the UE may use the TCI state of a Control Resource Set (CORESET) that was previously used to receive information. A CORESET is the time-frequency resource region where the UE monitors control messages (e.g., the physical downlink control channel (PDCCH)). Based on quasi-colocation (QCL) information in the TCI, the UE is able to determine how to receive a beamformed transmission from a base station (e.g., a gNB). For example, the QCL information may indicate which beam to use, which direction to point a beam, and what filters to use for channel estimation. Thus, the QCL information may enable the UE to determine how to receive a current transmission (e.g., a PDSCH) based on parameters the UE used to receive a prior transmission (e.g., using a prior CORESET).

The 3GPP TS 38.214 specification states as follows: "For both the cases when tci-PresentInDCI is set to 'enabled' and tci-PresentInDCI is not configured, if the offset between the reception of the DL DCI and the corresponding PDSCH is less than the threshold Threshold-Sched-Offset, the UE may assume that the DM-RS ports of PDSCH of a serving cell are quasi co-located with the RS(s) in the TCI state with respect to the QCL parameter(s) used for PDCCH quasi co-location indication of the lowest CORESET-ID in the latest slot in which one or more CORESETs within the active BWP of the serving cell are configured for the UE." Here, DM-RS refers to a Demodulation Reference Signal, RS(s) refers to Reference Signal(s), and BWP refers to a Bandwidth Part. Of note, a CORESET ID from the latest slot is selected, not the lowest CORESET ID across all slots. The lowest CORESET ID determination is based on the CORESETs in the active BWP of the serving cell.

Figure 2:
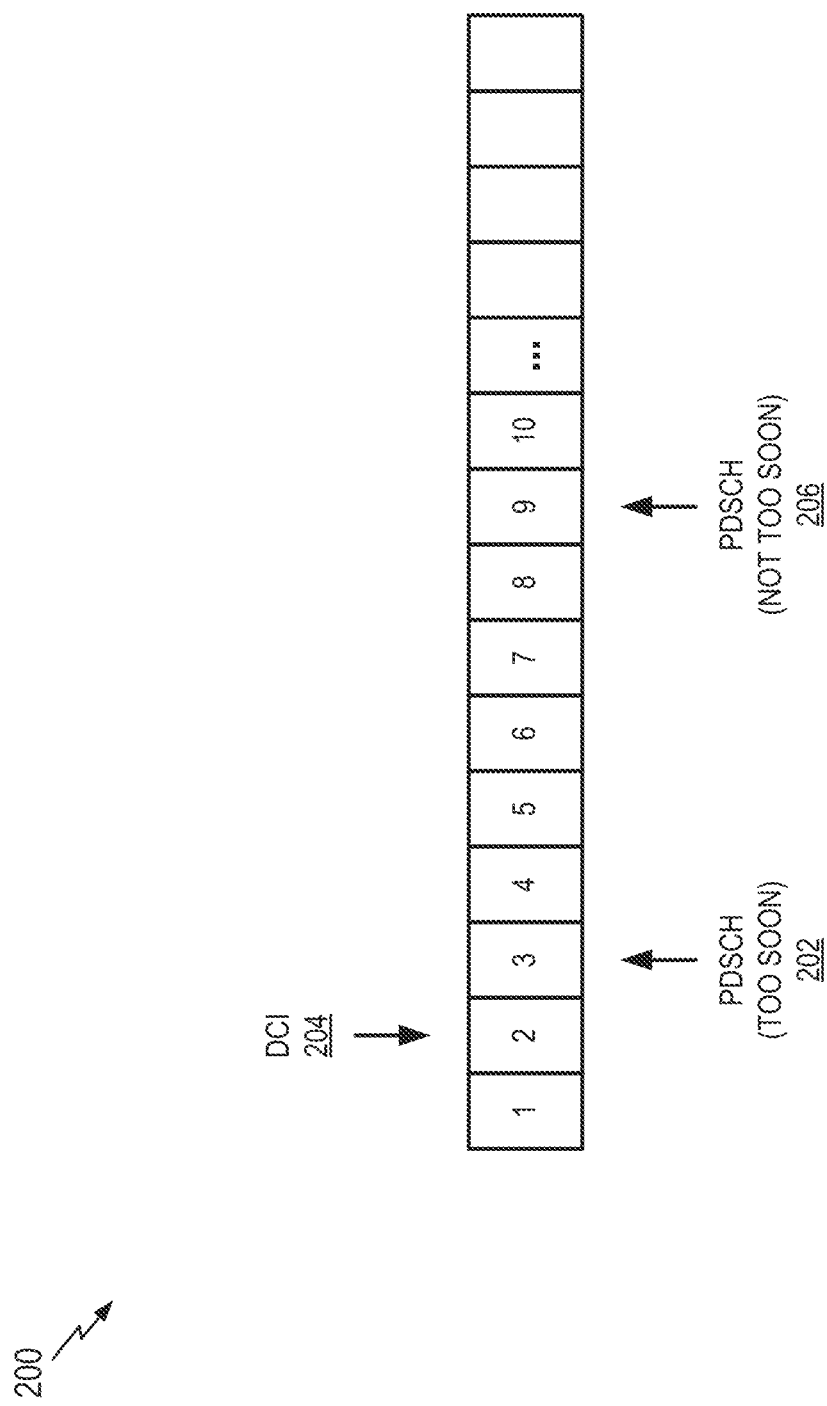
FIG. 2 is a timing diagram illustrating examples of PDSCH communication.

Thus, under the standard, if the PDSCH occurs "too soon" after the DCI, the beam configuration for PDSCH is not based on the TCI signaled in the DCI. A PDSCH may be considered to be "too soon" if, for example, the PDSCH is scheduled in a slot that is too close in time to the slot that carries the DCI such that a device that receives the DCI does not have sufficient time to decode the DCI and/or configure its receiver to use the TCI specified by the DCI. For example, a given UE may require a certain amount of time (e.g., corresponding to two or more slots) to decode a DCI. If a UE is unable to decode the DCI before the PDSCH arrives, the UE will not be able to determine which TCI the gNB designated for receiving the PDSCH. As another example, it may take a certain amount of time (e.g., corresponding to one or more slots) for a UE to reconfigure its receiver to use a new beam configuration (particularly where analog beamforming is used). If a UE is unable to configure its receiver to use, for example, beam and/or filter parameters specified by the TCI before the PDSCH arrives, the UE will not be able to use the configuration of that TCI to receive the PDSCH. Thus, in either case, a UE might not be able use the designated TCI to receive the PDSCH. FIG. 2 illustrates an example of DCI and PDSCH timing 200 where a PDSCH 202 occurs "too soon" (e.g., after a DCI 204) and an alternative example of a PDSCH 206 that is not "too soon."

If the PDSCH occurs "too soon" after the DCI (e.g., the DCI 204 in slot 2 of FIG. 2 indicates that the PDSCH 202 will follow in slot 3), then a default beam as specified in 3GPP TS 38.214 may be used for the PDSCH. Here, "too soon" may mean that the time gap between the DCI and the PDSCH is less than a specified duration (e.g., Threshold-Sched-Offset). This duration may be 1 slot, 2 slots, or some other period of time.

If the PDSCH occurs a sufficient amount of time after the DCI (i.e., the PDSCH does not occur "too soon") and if tci-PresentInDCI is set to 'enabled' in the UE configuration, the beam ID indicated in the DCI may be used for the PDSCH beam. An example may be seen with reference to FIG. 2 where the DCI 204 in slot 2 may indicate that the PDSCH 206 will follow in slot 9.

Cross Carrier Scheduling

Figure 3:
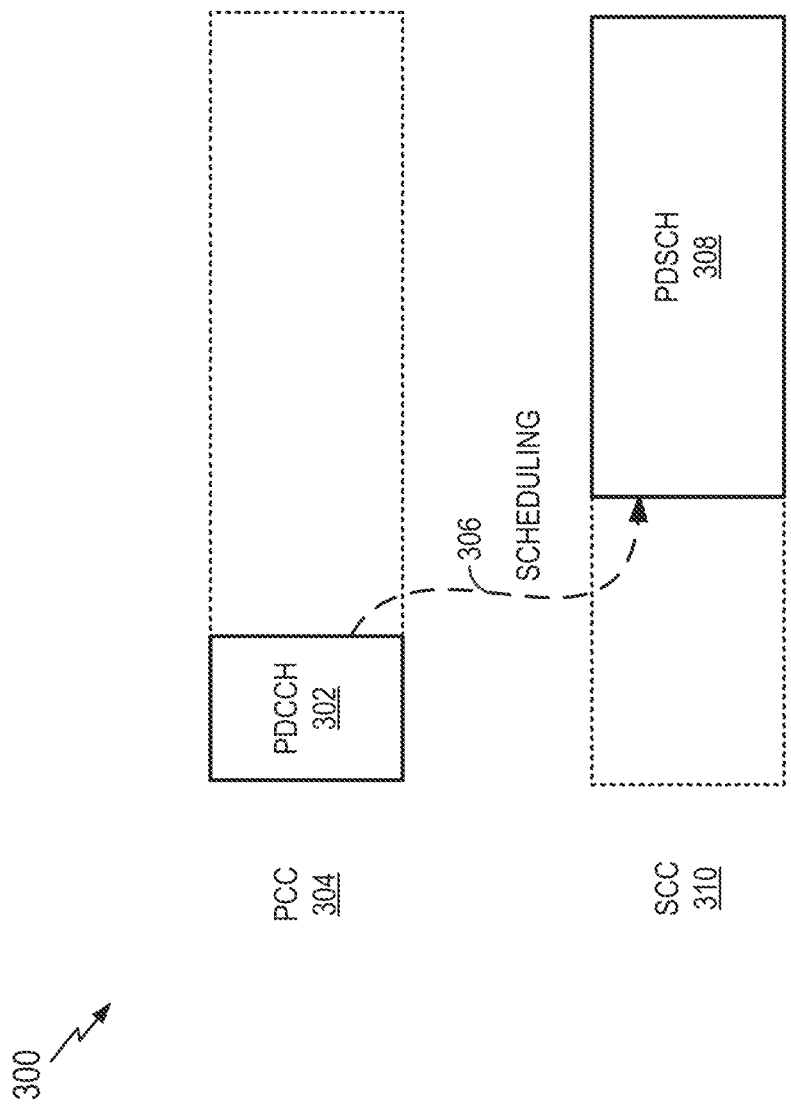
FIG. 3 is a timing diagram illustrating an example of cross carrier communication.

A wireless communication system may use multiple component carriers (e.g., carrier aggregation, CA) to improve communication performance. Such a system may use cross carrier scheduling whereby control information on one carrier (e.g., a PCC) schedules a transmission on another carrier (e.g., an SCC). For example, FIG. 3 illustrates an example of cross carrier scheduling 300 where a PDCCH 302 on a PCC 304 schedules 306 the transmission of a PDSCH 308 on an SCC 310. As one non-limiting example, a gNB (e.g., corresponding to the 5G cell 106 of FIG. 1) may send the PDCCH 302 via the PCC 304 to a UE (e.g., corresponding to the UE 102 or the UE 104 of FIG. 1) and send the PDSCH 308 via the SCC 310 to the UE according to the scheduling. The teachings herein can be applied to other multiple carrier scenarios as well. Cross carrier scheduling in a CA scenario may, for example, schedule across Frequency Range 1 (FR1) and Frequency Range 2 (FR2), or across 1-R2 (e.g., 28 GHz) and FR2 (e.g., 39 GHz).

When the SCC has a CORESET configured, the default rule can be used when the offset is less than the threshold (e.g., Threshold-Sched-Offset). However, the SCC need not always have a CORESET configured. In this case, the UE behavior is not defined.

Default Configuration for Cross Carrier Scheduling

Figure 4:
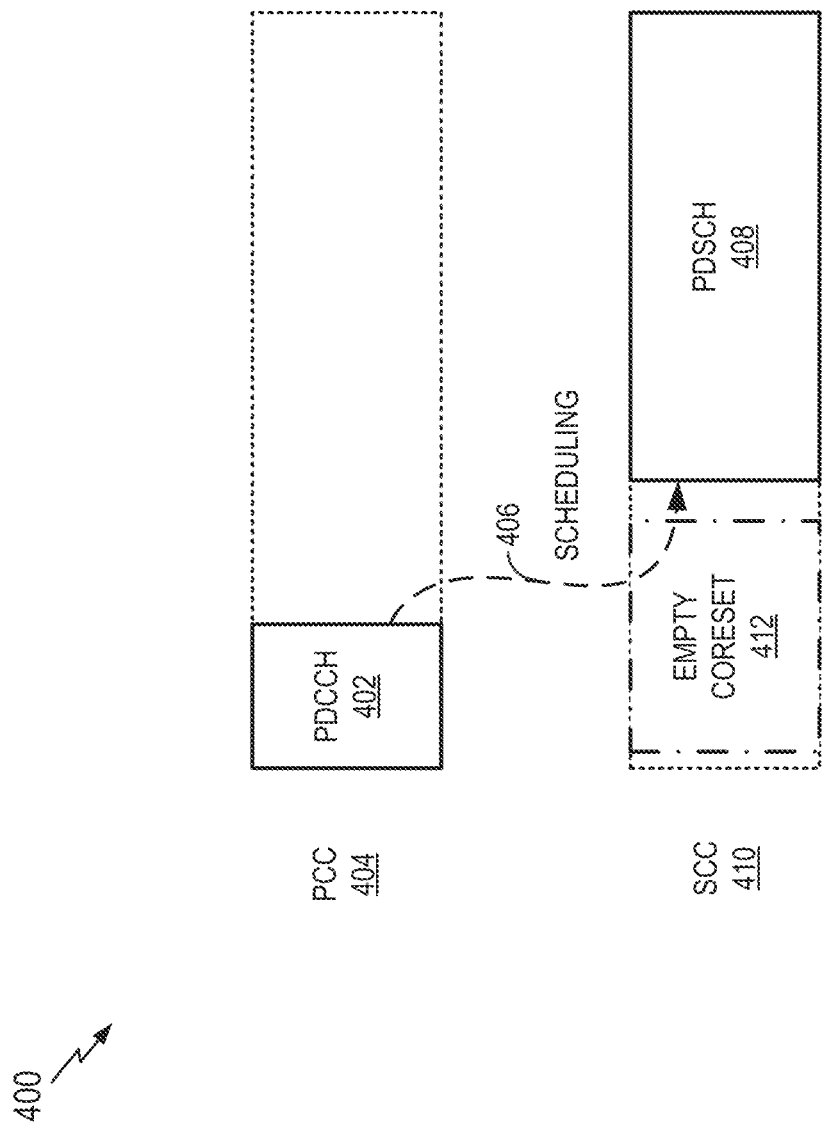
FIG. 4 is a timing diagram illustrating an example of PDSCH communication in accordance with some aspects of the disclosure.

Similar to FIG. 3, FIG. 4 illustrates an example of cross carrier scheduling 400 where a PDCCH 402 on a PCC 404 schedules 406 the transmission of a PDSCH 408 on an SCC 410. As one non-limiting example, a gNB (e.g., corresponding to the 5G cell 106 of FIG. 1) may send the PDCCH 402 via the PCC 404 to a UE (e.g., corresponding to the UE 102 or the UE 104 of FIG. 1) and send the PDSCH 408 via the SCC 410 to the UE according to the scheduling. In this case, however, the CORESET 412 is empty (e.g., a CORESET is not defined for the SCC 410).

The disclosure relates in some aspects to specifying a default configuration for cross carrier scheduling. For example, a gNB may configure a default rule for QCL determination of PDSCH when no CORESET and/or Search Space is configured in the SCC.

The default rule may take various forms. For example, the default rule may take the form of a Virtual CORESET Configuration, a Virtual Search Space Configuration, a Default PDSCH QCL, or a PDSCH QCL pattern across time (e.g., across slots and/or mini-slots).

The default rule may be signaled (e.g., from a gNB to a UE) in various ways. For example, the signaling of the default rule may be via Radio Resource Control (RRC) signaling, via a Media Access Control-Control Element (MAC-CE), via DCI, or via a combination of the above.

Example Communication Components

Figure 5:
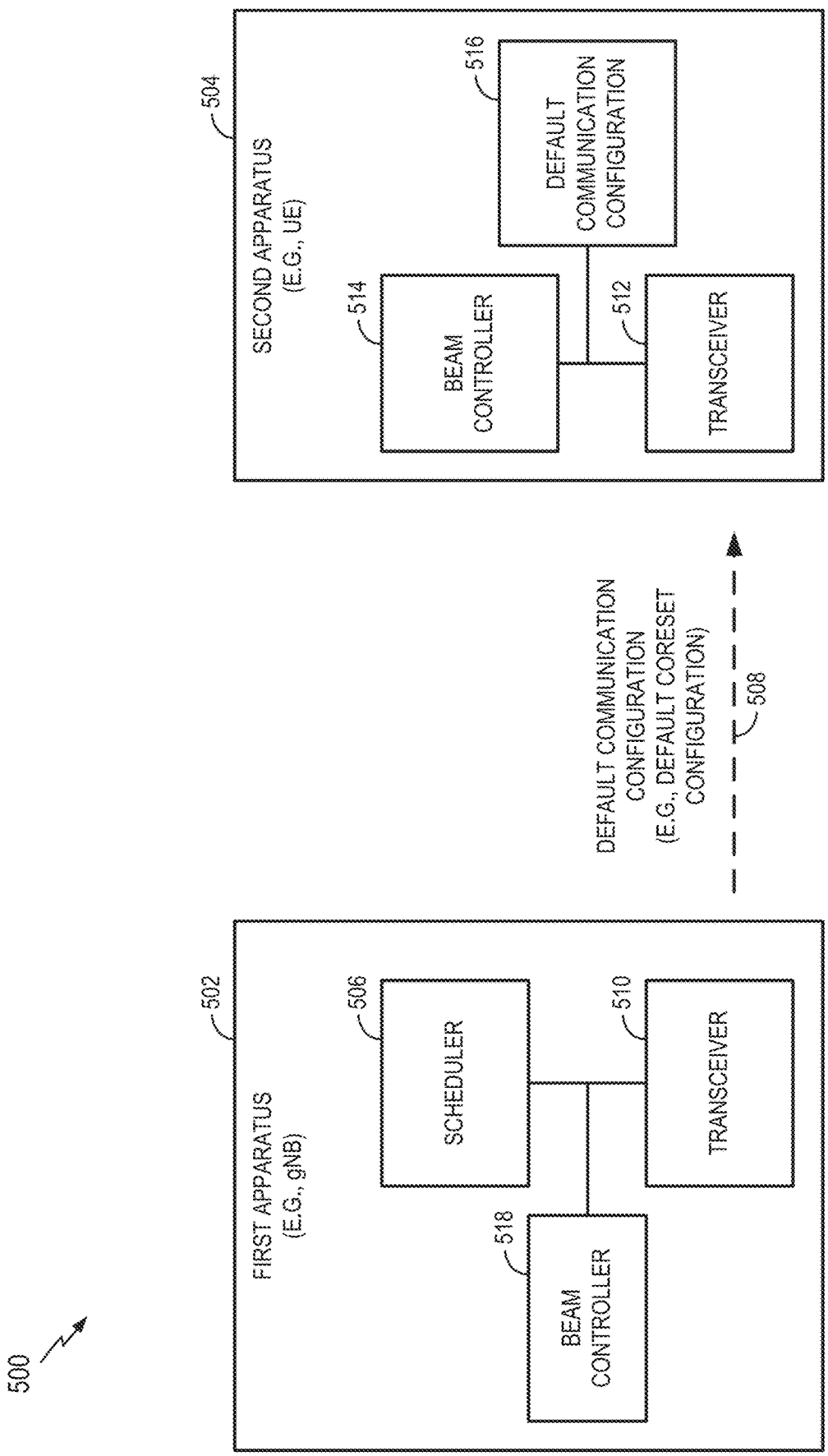
FIG. 5 is a block diagram illustrating an example communication system where an apparatus may use a default communication configuration in accordance with some aspects of the disclosure.

FIG. 5 is a schematic illustration of a wireless communication system 500 that incorporates the teachings herein to more effectively determine the beam configuration and/or other configuration information to be used for sending messages (e.g., data, control information, etc.). The wireless communication system 500 includes a first apparatus 502

(e.g., a wireless communication device) and a second apparatus 504 (e.g., a wireless communication device), and potentially other apparatuses (not shown). In some implementations, the first apparatus 502 may correspond to the 5G cell 106 (e.g., a gNB, a transmit receive point, etc.) or some other component of FIG. 1. In some implementations, the second apparatus 504 may correspond to the UE 102, the UE 104, or some other component of FIG. 1.

The first apparatus 502 includes a scheduler 506 for generating a schedule for communicating with the second apparatus 504 and/or other apparatuses. To this end, the first apparatus 502 may send information such as control information (e.g., DCI), resource sets (e.g., CORESETs), and data (e.g., PDSCH) to the second apparatus 504 via a transceiver 510. In accordance with the teachings herein, the first apparatus 502 may send a default communication configuration (e.g., a default CORESET configuration) 508 to the second apparatus 504. The second apparatus 504 includes a transceiver 512 for receiving the default communication configuration 508 and other information. The second apparatus 504 also includes a beam controller 514 for determining the beam configuration the transceiver 512 is to use for communication with the first apparatus 502 and/or one or more other devices. In accordance with the teachings here, the beam determination may be based on a default communication configuration 516 received from the first apparatus 502.

The first apparatus 502 also includes a beam controller 518 for determining the beam configuration the transceiver 510 is to use for communication with the second apparatus 504 and/or one or more other devices. For example, the beam controller 518 may select the best beam configuration for the transceiver 510 to use when the transceiver 512 is using a default beam configuration.

Virtual CORESET Configuration

In some implementations, a Virtual CORESET Configuration may take the form of a CORESET having empty frequency and time resources. For example, the CORESET may simply include beam information. In this case, a UE may determine that a received CORESET configuration is to be used as a default (e.g., for SCC) based on the absence of frequency and time resource information in the CORESET.

The default rule can be determined from one or more of such a Virtual CORESET configuration. For example, one Virtual CORESET configuration may provide default beam information for one set of slots and another Virtual CORESET configuration may provide default beam information for another set of slots.

Virtual Search Space Configuration

In some implementations, a Virtual Search Space Configuration may take the form of a Search Space where no candidates are monitored in any of the aggregation levels. For example, the Search Space may simply indicate slots to be searched and associated CORESET IDs. In this case, a UE may determine that a received Search Space configuration is to be used as a default (e.g., for SCC) based on the absence of aggregation level information in the Search Space.

Default PDSCH QCL

A Default PDSCH QCL may specify the QCL to be used for one or more slots. For example, a Default PDSCH QCL may specify the QCL to be used for all SCC slots.

As a more specific example, in Format 1_0 (no PDSCH QCL is explicitly signaled in the DCI), the default PDSCH QCL can be followed in the SCC.

As another example, in Format 1_1, if the offset is less than a threshold, the default QCL can be followed. Otherwise, if the offset is greater than or equal to the threshold, the TCI indicated in the DCI can be followed.

PDSCH QCL Pattern

In some implementations, a PDSCH QCL Pattern can be configured across slots (e.g., in the SCC). For example, one PDSCH QCL Pattern may provide default beam information for one set of slots and another PDSCH QCL Pattern may provide default beam information for another set of slots. A periodicity also could be specified for a pattern.

For Format 1_0 (no PDSCH QCL is explicitly signaled in the DCI), the default PDSCH QCL pattern can be followed in the SCC.

For Format 1_1, if the offset is less than the threshold, the default pattern can be followed. Otherwise, if the offset is greater than or equal to a threshold, the TCI indicated in the DCI can be followed.

PUSCH

The teachings herein are also applicable to uplink communication or other types of communication involving cross carrier scheduling. For example, a gNB may configure a default rule for QCL determination of PUSCH when no CORESET and/or Search Space is configured in the SCC. As one example, the same default QCL pattern approach described above may be applicable to PUSCH.

Figure 6:
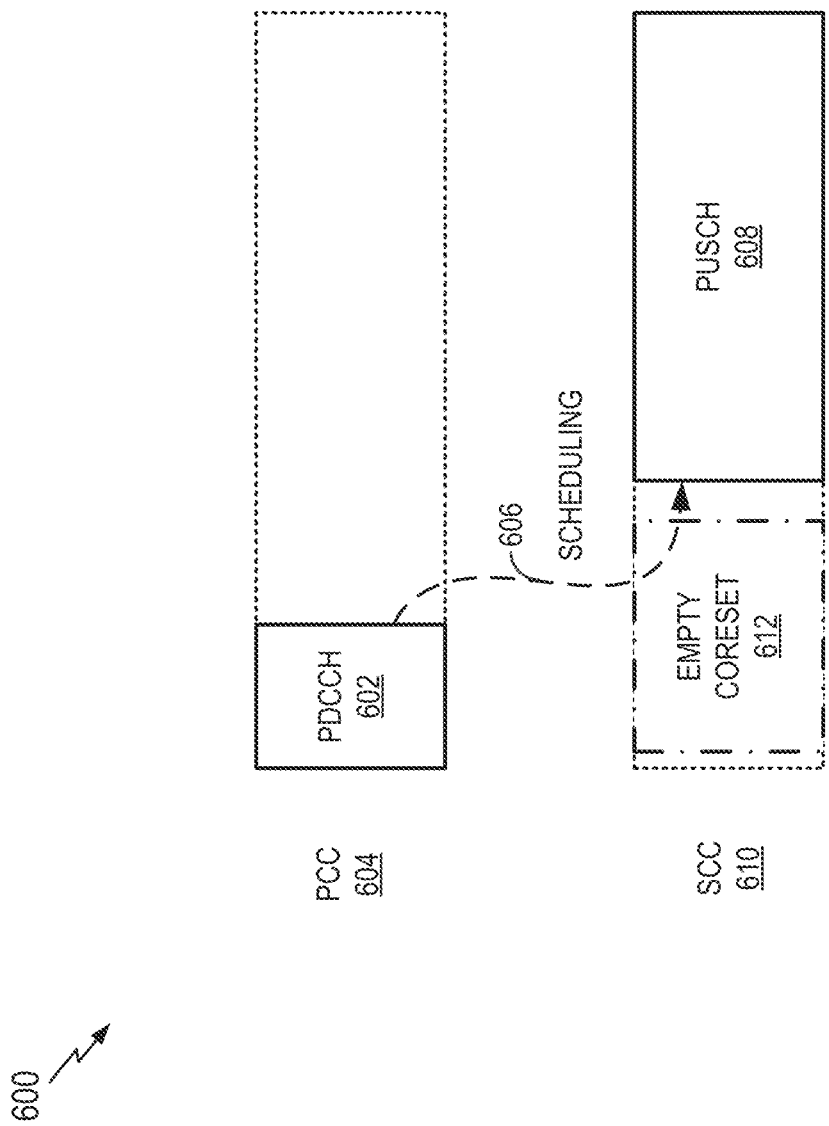
FIG. 6 is a timing diagram illustrating an example of PUSCH communication in accordance with some aspects of the disclosure.

FIG. 6 illustrates an example of cross carrier scheduling 600 where a PDCCH 602 on a PCC 604 schedules 606 the transmission of a PUSCH 608 on an SCC 610. As one non-limiting example, a gNB (e.g., corresponding to the 5G cell 106 of FIG. 1) may send the PDCCH 602 via the PCC 604 to a UE (e.g., corresponding to the UE 102 or the UE 104 of FIG. 1) and receive the PUSCH 608 via the SCC 610 from the UE according to the scheduling. Similar to FIG. 4, the CORESET 612 is empty in this case.

In the case of PUSCH, a Sounding Reference Signal (SRS) could be configured but need not be transmitted (similar to virtual SRS). For example, a gNB may configure a UE with certain SRS indices mapped to certain Synchronization Signal Blocks (SSBs). The gNB can then send an SRS index to a UE to signal the UE to determine the beam configuration that the UE used to receive the corresponding SSB, so that the UE can use that same beam configuration to send PUSCH data on the SCC in response to a grant on the PCC. A Scheduling Request Indicator (SRI) can be used to signal QCL information for PUSCH.

Use of a Specified Offset

In some implementations, the DCI always carries the TCI state information and the offset is always defined to be greater than the offset threshold. For example, in some implementations, for the case where SCC in FR2 does not have a configured CORESET, and is cross carrier scheduled via the DCI from a different carrier, the DCI carries the TCI state information for the reception of PDSCH. In addition, the offset between the reception of the DL DCI and the DL PDSCH is equal to or greater than the threshold Threshold-Sched-Offset.

In some implementations, a minimum offset threshold KO can be a configuration parameter and can be defined the same as Threshold-Sched-Offset. In some implementations, for SCC without a configured CORESET where PDSCH is scheduled via a DCI in the PCC, the DCI may carry the TCI state for the PDSCH, for example, using DCI Format 1_1. Again, the offset between the DCI and the PDSCH is greater than or equal to the Threshold-Sched-Offset. In some implementations, the minimum KO (offset) can be set to be equal to the Threshold-Sched-Offset.

Example Operations

Figure 7:
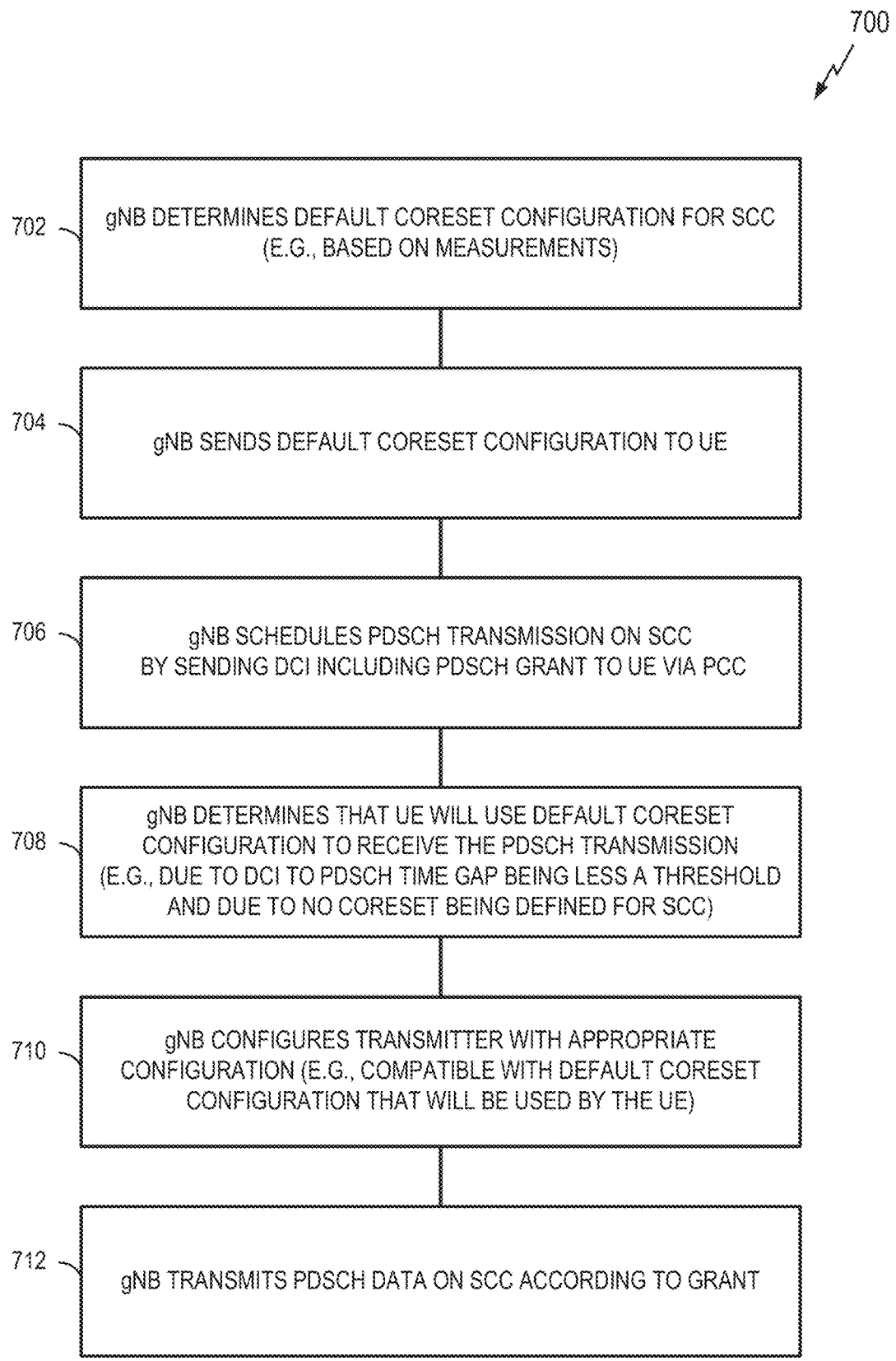
FIG. 7 is a flowchart illustrating an example of a process for providing a default CORESET configuration for a UE in accordance with some aspects of the disclosure.

FIG. 7 illustrates a process 700 for communication in accordance with some aspects of the disclosure. The process 700 may take place within a processing circuit (e.g., the processing circuit 910 of FIG. 9), which may be located in a gNB, a TRP, a BS, an eNB, a CPE, or some other suitable apparatus. In some aspects, the process 700 may be performed by the 5G cell 106 of FIG. 1, the first apparatus 502 of FIG. 5, or some other similar apparatus. Of course, in various aspects within the scope of the disclosure, the process 700 may be implemented by any suitable apparatus capable of supporting communication-related operations.

At block 702, an apparatus (e.g., a gNB) determines the default CORESET configuration to be used for the SCC. For example, this configuration may be determined based on channel estimation measurements or other information.

At block 704, the apparatus sends the default CORESET configuration to a UE.

At block 706, the apparatus schedules a PDSCH transmission on the SCC. For example, the apparatus may send to the UE, via the PCC, a DCI that includes a PDSCH grant for the SCC.

At block 708, the apparatus determines that the UE will use the default CORESET configuration to receive the PDSCH transmission. For example, the apparatus may determine that the CORESET information is needed because the time gap between the DCI and the PDSCH scheduled by that DCI is too short. In addition, the apparatus may determine that there is no CORESET defined for the SCC.

At block 710, the apparatus configures its transmitter with the appropriate configuration (e.g., a configuration that is compatible with the default CORESET configuration that will be used by the UE).

At block 710, the apparatus transmits the PDSCH data on the SCC according to the grant.

In some aspects, a process in accordance with the teachings herein may include any combination of the above operations.

Example Operations

Figure 8:
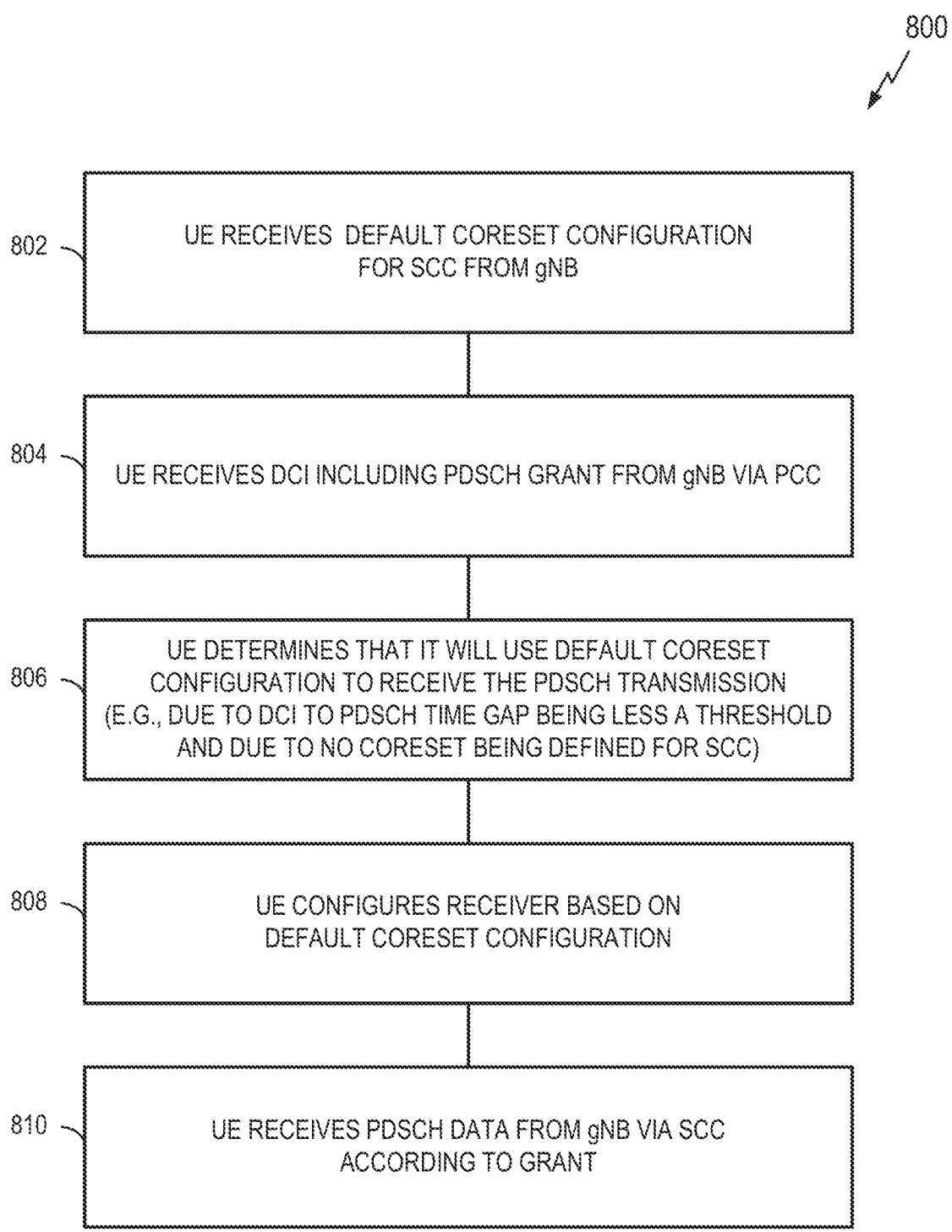
FIG. 8 is a flowchart illustrating an example of a process for a UE using a default CORESET configuration in accordance with some aspects of the disclosure.

FIG. 8 illustrates a process 800 for communication in accordance with some aspects of the disclosure. The process 800 may take place within a processing circuit (e.g., the processing circuit 1310 of FIG. 13), which may be located in a UE, a gNB, a TRP, a BS, an eNB, a CPE, or some other suitable apparatus. In some aspects, the process 700 may be performed by the UE 102 or the UE 104 of FIG. 1, the second apparatus 504 of FIG. 5, or some other similar apparatus. Of course, in various aspects within the scope of the disclosure, the process 800 may be implemented by any suitable apparatus capable of supporting communication-related operations.

At block 802, an apparatus (e.g., a UE) receives the default CORESET configuration to be used for the SCC (e.g., from a serving gNB).

At block 804, the apparatus receives a DCI that includes a PDSCH grant for the SCC. For example, a UE may receive the DCI from a gNB.

At block 806, the apparatus determines that it will use the default CORESET configuration to receive the PDSCH transmission. For example, the apparatus may determine that the CORESET information is needed because the time gap between the DCI and the PDSCH scheduled by that DCI is too short. In addition, the apparatus may determine that there is no CORESET defined for the SCC.

At block 808, the apparatus configures its receiver based on the default CORESET configuration.

At block 810, the apparatus selects the TCI state indicated in the subsequent SPS DCI or the TCI state of the CORESET used to decode the subsequent SPS DCI.

At block 812, the apparatus receives the PDSCH data on the SCC according to the grant. For example, a UE may receive the PDSCH data from a serving gNB.

In some aspects, a process in accordance with the teachings herein may include any combination of the above operations.

First Example Apparatus

Figure 9:
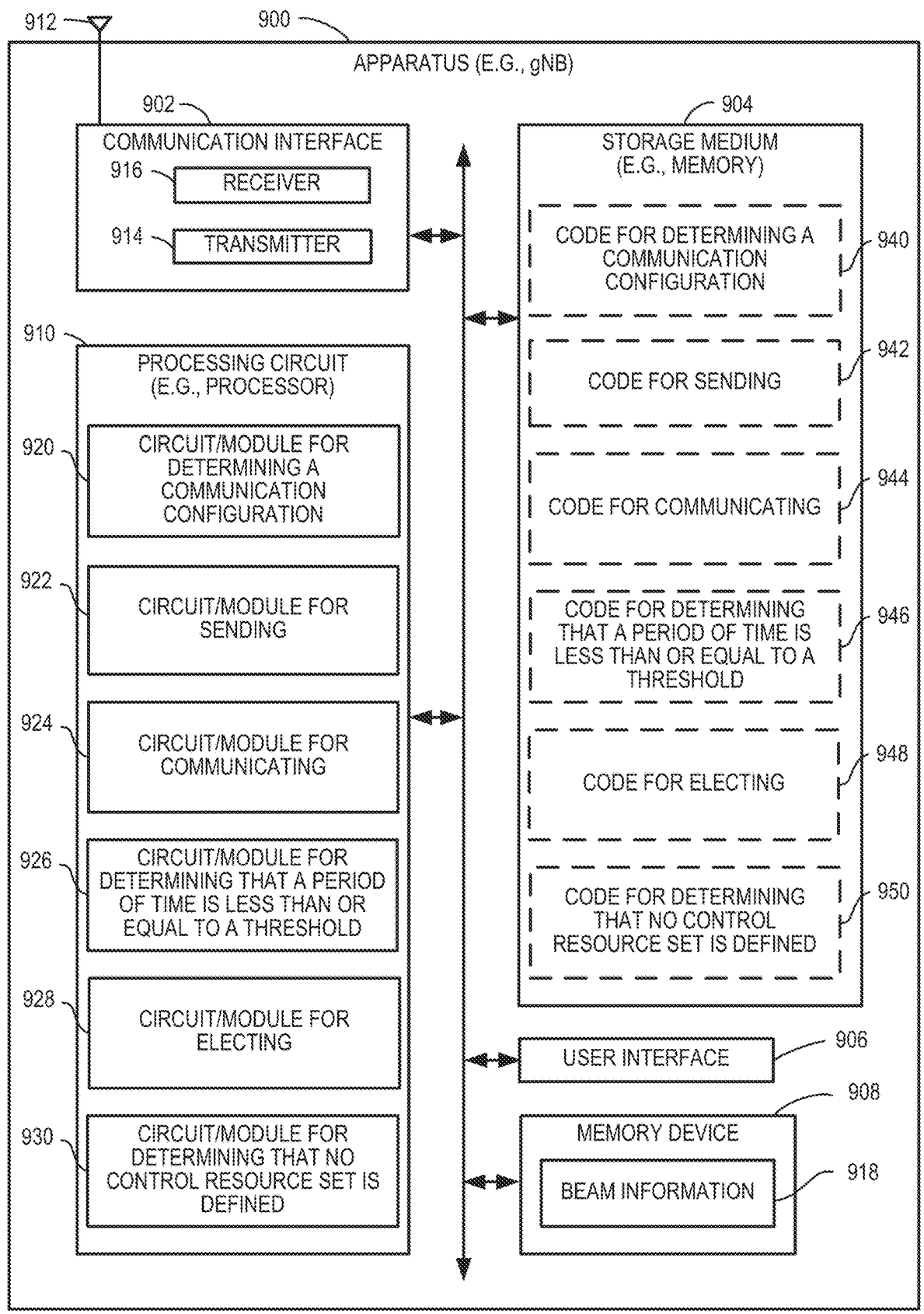
FIG. 9 is a block diagram illustrating an example hardware implementation for an apparatus (e.g., an electronic device) that can support communication in accordance with some aspects of the disclosure.

FIG. 9 illustrates a block diagram of an example hardware implementation of an apparatus 900 configured to communicate according to one or more aspects of the disclosure. The apparatus 900 could embody or be implemented within a gNB, a transmit receive point (TRP), a base station (BS), an eNode B (eNB), a CPE, or some other type of device that supports wireless communication. In various implementations, the apparatus 900 could embody or be implemented within an access terminal, an access point, or some other type of device. In various implementations, the apparatus 900 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 900 includes a communication interface (e.g., at least one transceiver) 902, a storage medium 904, a user interface 906, a memory device (e.g., a memory circuit) 908, and a processing circuit 910 (e.g., at least one processor). In various implementations, the user interface 906 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 9. The signaling bus may include any number of interconnecting buses and bridges depending on the specific application of the processing circuit 910 and the overall design constraints. The signaling bus links together various circuits such that each of the communication interface 902, the storage medium 904, the user interface 906, and the memory device 908 are coupled to and/or in electrical communication with the processing circuit 910. The signaling bus may also link various other circuits (not shown) such as timing sources, peripherals, voltage regulators, and power management circuits, which are well known in the art, and therefore, will not be described any further.

The communication interface 902 provides a means for communicating with other apparatuses over a transmission medium. In some implementations, the communication interface 902 includes circuitry and/or programming adapted to facilitate the communication of information bi-directionally with respect to one or more communication devices in a network. In some implementations, the communication interface 902 is adapted to facilitate wireless communication of the apparatus 900. In these implementations, the communication interface 902 may be coupled to one or more antennas 912 as shown in FIG. 9 for wireless communication within a wireless communication system. In some implementations, the communication interface 902 may be configured for wire-based communication. For example, the communication interface 902 could be a bus interface, a send/receive interface, or some other type of signal interface including drivers, buffers, or other circuitry for outputting and/or obtaining signals (e.g., outputting signal from and/or receiving signals into an integrated circuit). The communication interface 902 can be configured with one or more standalone receivers and/or transmitters, as well as one or more transceivers. In the illustrated example, the communication interface 902 includes a transmitter 914 and a receiver 916. The communication interface 902 serves as one example of a means for receiving and/or means transmitting.

The memory device 908 may represent one or more memory devices. As indicated, the memory device 908 may maintain beam information 918 along with other information used by the apparatus 900. In some implementations, the memory device 908 and the storage medium 904 are implemented as a common memory component. The memory device 908 may also be used for storing data that is manipulated by the processing circuit 910 or some other component of the apparatus 900.

The storage medium 904 may represent one or more computer-readable, machine-readable, and/or processor-readable devices for storing programming, such as processor executable code or instructions (e.g., software, firmware), electronic data, databases, or other digital information. The storage medium 904 may also be used for storing data that is manipulated by the processing circuit 910 when executing programming. The storage medium 904 may be any available media that can be accessed by a general purpose or special purpose processor, including portable or fixed storage devices, optical storage devices, and various other mediums capable of storing, containing or carrying programming.

By way of example and not limitation, the storage medium 904 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 904 may be embodied in an article of manufacture (e.g., a computer program product). By way of example, a computer program product may include a computer-readable medium in packaging materials. In view of the above, in some implementations, the storage medium 904 may be a non-transitory (e.g., tangible) storage medium. For example, the storage medium 904 may be a non-transitory computer-readable medium storing computer-executable code, including code to perform operations as described herein.

The storage medium 904 may be coupled to the processing circuit 910 such that the processing circuit 910 can read information from, and write information to, the storage medium 904. That is, the storage medium 904 can be coupled to the processing circuit 910 so that the storage medium 904 is at least accessible by the processing circuit 910, including examples where at least one storage medium is integral to the processing circuit 910 and/or examples where at least one storage medium is separate from the processing circuit 910 (e.g., resident in the apparatus 900, external to the apparatus 900, distributed across multiple entities, etc.).

Programming stored by the storage medium 904, when executed by the processing circuit 910, causes the processing circuit 910 to perform one or more of the various functions and/or process operations described herein. For example, the storage medium 904 may include operations configured for regulating operations at one or more hardware blocks of the processing circuit 910, as well as to utilize the communication interface 902 for wireless communication utilizing their respective communication protocols.

The processing circuit 910 is generally adapted for processing, including the execution of such programming stored on the storage medium 904. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 910 is arranged to obtain, process and/or send data, control data access and storage, issue commands, and control other desired operations. The processing circuit 910 may include circuitry configured to implement desired programming provided by appropriate media in at least one example. For example, the processing circuit 910 may be implemented as one or more processors, one or more controllers, and/or other structure configured to execute executable programming Examples of the processing circuit 910 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 910 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 910 are for illustration and other suitable configurations within the scope of the disclosure are also contemplated.

According to one or more aspects of the disclosure, the processing circuit 910 may be adapted to perform any or all of the features, processes, functions, operations and/or routines for any or all of the apparatuses described herein. For example, the processing circuit 910 may be configured to perform any of the steps, functions, and/or processes described with respect to FIGS. 1-8 and 10. As used herein, the term "adapted" in relation to the processing circuit 910 may refer to the processing circuit 910 being one or more of configured, employed, implemented, and/or programmed to perform a particular process, function, operation and/or routine according to various features described herein.

The processing circuit 910 may be a specialized processor, such as an application-specific integrated circuit (ASIC) that serves as a means for (e.g., structure for) carrying out any one of the operations described in conjunction with FIGS. 1-8 and 10-12. The processing circuit 910 serves as one example of a means for transmitting and/or a means for receiving. In various implementations, the processing circuit 910 may provide and/or incorporate, at least in part, the functionality described above for the first apparatus 502 (e.g., the scheduler 506 and/or the beam controller 518) of FIG. 5.

According to at least one example of the apparatus 900, the processing circuit 910 may include one or more of a circuit/module for determining a communication configuration 920, a circuit/module for sending 922, a circuit/module for communicating 924, a circuit/module for determining that a period of time is less than or equal to a threshold 926, a circuit/module for electing 928, or a circuit/module for determining that no control resource set is defined 930. In various implementations, the circuit/module for determining a communication configuration 920, the circuit/module for sending 922, the circuit/module for communicating 924, the circuit/module for determining that a period of time is less than or equal to a threshold 926, the circuit/module for electing 928, or the circuit/module for determining that no control resource set is defined 930 may provide and/or incorporate, at least in part, the functionality described above for the first apparatus 502 (e.g., one or more of the scheduler 506 or the beam controller 518) of FIG. 5.

As mentioned above, programming stored by the storage medium 904, when executed by the processing circuit 910, causes the processing circuit 910 to perform one or more of the various functions and/or process operations described herein. For example, the programming may cause the processing circuit 910 to perform the various functions, steps, and/or processes described herein with respect to FIGS. 1-8 and 10-12 in various implementations. As shown in FIG. 9, the storage medium 904 may include one or more of code for determining a communication configuration 940, code for sending 942, code for communicating 944, code for determining that a period of time is less than or equal to a threshold 946, code for electing 948, or code for determining that no control resource set is defined 950. In various implementations, the code for determining a communication configuration 940, the code for sending 942, the code for communicating 944, the code for determining that a period of time is less than or equal to a threshold 946, the code for electing 948, or the code for determining that no control resource set is defined 950 may be executed or otherwise used to provide the functionality described herein for the circuit/module for determining a communication configuration 920, the circuit/module for sending 922, the circuit/module for communicating 924, the circuit/module for determining that a period of time is less than or equal to a threshold 926, the circuit/module for electing 928, or the circuit/module for determining that no control resource set is defined 930.

The circuit/module for determining a communication configuration 920 may include circuitry and/or programming (e.g., code for determining a communication configuration 940 stored on the storage medium 904) adapted to perform several functions relating to, for example, determining a default communication configuration (e.g., a default CORESET) or another communication configuration (e.g., CORESET configuration) as discussed herein. In some aspects, the circuit/module for determining a communication configuration 920 (e.g., a means for determining a communication configuration) may correspond to, for example, a processing circuit.

The circuit/module for sending 922 may include circuitry and/or programming (e.g., code for sending 942 stored on the storage medium 904) adapted to perform several functions relating to, for example, sending (e.g., transmitting) information. In some implementations, the circuit/module for sending 922 may obtain information (e.g., from the memory device 908, or some other component of the apparatus 900), process the information (e.g., encode the information for transmission), and send the information to another component (e.g., the transmitter 914, the communication interface 902, or some other component) that will transmit the information to another device. In some scenarios (e.g., if the circuit/module for sending 922 includes a transmitter), the circuit/module for sending 922 transmits the information directly to another device (e.g., the ultimate destination) via radio frequency signaling or some other type of signaling suitable for the applicable communication medium.

The circuit/module for sending 922 (e.g., a means for sending) may take various forms. In some aspects, the circuit/module for sending 922 may correspond to, for example, an interface (e.g., a bus interface, a send/receive interface, or some other type of signal interface), a communication device, a transceiver, a transmitter, or some other similar component as discussed herein. In some implementations, the communication interface 902 includes the circuit/module for sending 922 and/or the code for sending 942. In some implementations, the circuit/module for sending 922 and/or the code for sending 942 is configured to control the communication interface 902 (e.g., a transceiver or a transmitter) to transmit information.

The circuit/module for communicating 924 may include circuitry and/or programming (e.g., code for communicating 944 stored on the storage medium 904) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 924 may communicate a message. In some aspects, the circuit/module for communicating 924 may communicate an indication.

In some implementations where the communicating involves receiving information, the circuit/module for communicating 924 receives information (e.g., from the communication interface 902, the receiver 916, the memory device 908, some other component of the apparatus 900, or some other device), processes (e.g., decodes) the information, and outputs the information to another component of the apparatus 900 (e.g., the memory device 908 or some other component). In some scenarios (e.g., if the circuit/module for communicating 924 includes a receiver), the communicating involves the circuit/module for communicating 924 receiving information directly from a device that transmitted the information (e.g., via radio frequency signaling or some other type of signaling suitable for the applicable communication medium).

In some implementations where the communicating involves sending information, the circuit/module for communicating 924 obtains information (e.g., from the memory device 908 or some other component of the apparatus 900), processes (e.g., encodes) the information, and outputs the processed information. In some scenarios, the communicating involves sending the information to another component of the apparatus 900 (e.g., the transmitter 914, the communication interface 902, or some other component) that will transmit the information to another device. In some scenarios (e.g., if the circuit/module for communicating 924 includes a transmitter), the communicating involves the circuit/module for communicating 924 transmitting the information directly to another device (e.g., the ultimate destination) via radio frequency signaling or some other type of signaling suitable for the applicable communication medium.

The circuit/module for communicating 924 (e.g., a means for communicating) may take various forms. In some aspects, the circuit/module for communicating 924 may correspond to, for example, an interface (e.g., a bus interface, a send/receive interface, or some other type of signal interface), a communication device, a transceiver, a transmitter, a receiver, or some other similar component as discussed herein. In some implementations, the communication interface 902 includes the circuit/module for communicating 924 and/or the code for communicating 944. In some implementations, the circuit/module for communicating 924 and/or the code for communicating 944 is configured to control the communication interface 902 (e.g., a transceiver, a receiver, or a transmitter) to communicate the information.

The circuit/module for determining that a period of time is less than or equal to a threshold 926 may include circuitry and/or programming (e.g., code for determining that a period of time is less than or equal to a threshold 946 stored on the storage medium 904) adapted to perform several functions relating to, for example, comparing a period of time to a threshold and outputting an indication thereof as discussed herein. In some aspects, the circuit/module for determining that a period of time is less than or equal to a threshold 926 (e.g., a means for determining that a period of time is less than or equal to a threshold) may correspond to, for example, a processing circuit.

The circuit/module for electing 928 may include circuitry and/or programming (e.g., code for electing 948 stored on the storage medium 904) adapted to perform several functions relating to, for example, electing to determine another communication configuration based on a default communication configuration as discussed herein (e.g., where the election is triggered based on one or more criterion as discussed herein). In some aspects, the circuit/module for electing 928 (e.g., a means for electing) may correspond to, for example, a processing circuit.

The circuit/module for determining that no control resource set is defined 930 may include circuitry and/or programming (e.g., code for determining that no control resource set is defined 950 stored on the storage medium 904) adapted to perform several functions relating to, for example, checking a current configuration for a carrier to identify resources assigned for the carrier as discussed herein. In some aspects, the circuit/module for determining that no control resource set is defined 930 (e.g., a means for determining that no control resource set is defined) may correspond to, for example, a processing circuit.

First Example Process

Figure 10:
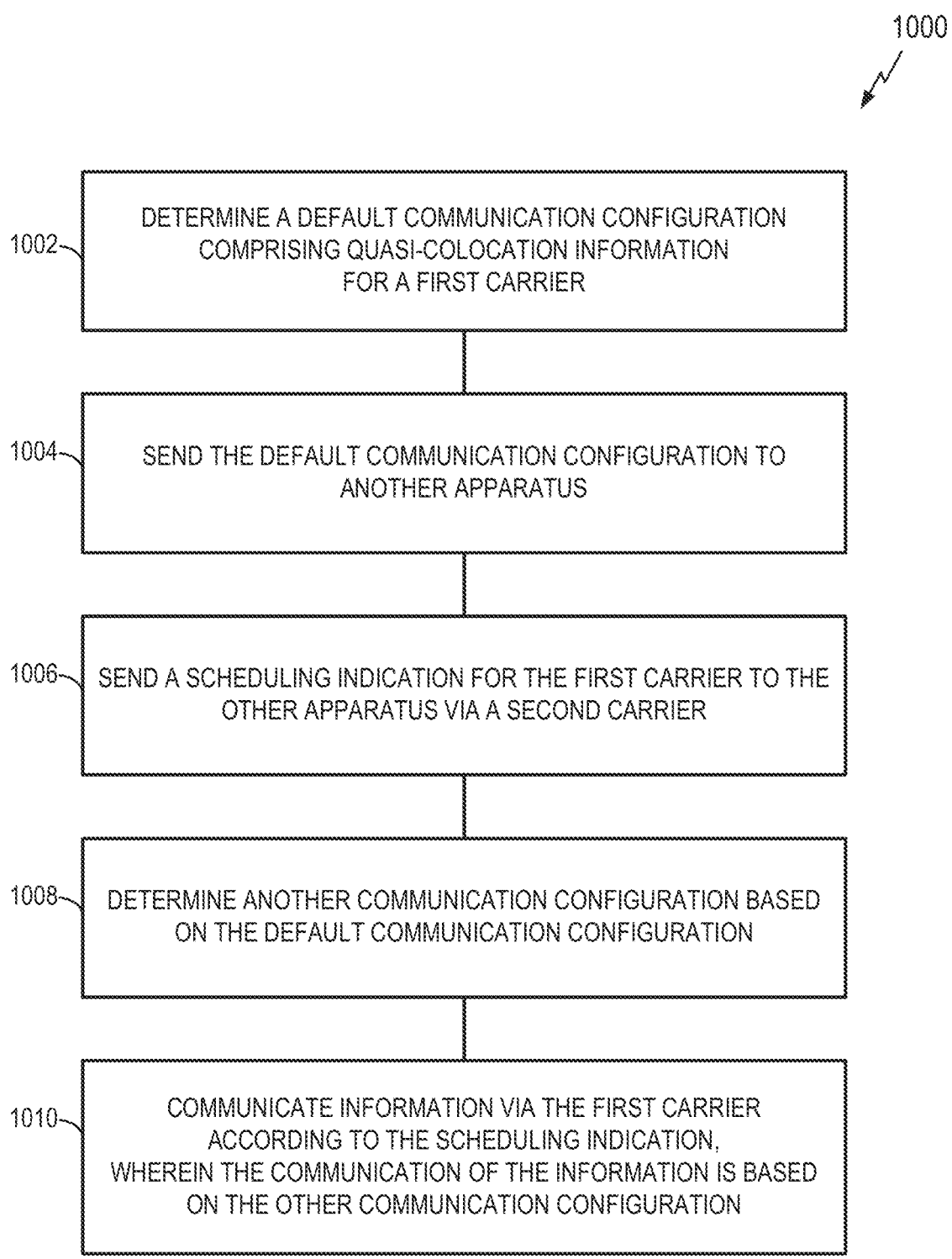
FIG. 10 is a flowchart illustrating an example of a communication process using configuration information in accordance with some aspects of the disclosure.

FIG. 10 illustrates a process 1000 for communication in accordance with some aspects of the disclosure. The process 1000 may take place within a processing circuit (e.g., the processing circuit 910 of FIG. 9), which may be located in a gNB, a TRP, a BS, an eNB, a CPE, or some other suitable apparatus. In some aspects, the process 1000 may be performed by the 5G cell 106 of FIG. 1, the first apparatus 502 of FIG. 5, or some other similar apparatus. Of course, in various aspects within the scope of the disclosure, the process 1000 may be implemented by any suitable apparatus capable of supporting communication-related operations.

At block 1002, an apparatus (e.g., a gNB) determines a default communication configuration comprising quasi-co-location information for a first carrier. For example, a gNB may select a default CORESET configuration for an SCC.

The default communication configuration may take different forms in different implementations or scenarios. In some aspects, the default communication configuration may be for receiving data on the PDSCH. In some aspects, the default communication configuration may be for transmitting data on the PUSCH. In some aspects, the default communication configuration may include at least one of: a filter, a Doppler shift, a Doppler spread, an average delay, a delay spread, a spatial receive parameter, or any combination thereof. In some aspects, the default communication configuration may include a default control resource set configuration. In some aspects, the default control resource set configuration might not specify any frequency and time resources. In some aspects, the default communication configuration may include a virtual search space configuration. In some aspects, the virtual search space configuration might not specify any aggregation levels. In some aspects, the default communication configuration may include default quasi-colocation information for the first carrier. In some aspects, the default communication configuration may include a default quasi-colocation information pattern for the first carrier. In some aspects, the default communication configuration may include beam information.

In some implementations, the circuit/module for determining a communication configuration 920 of FIG. 9 performs the operations of block 1002 and/or other similar operations as taught herein. In some implementations, the code for determining a communication configuration 940 of FIG. 9 is executed to perform the operations of block 1002 and/or other similar operations as taught herein.

At block 1004, the apparatus sends the default communication configuration to another apparatus. For example, a gNB may send (e.g., via an interface of the gNB) the default communication configuration to a UE.

In some implementations, the circuit/module for sending 922 of FIG. 9 performs the operations of block 1004 and/or other similar operations as taught herein. In some implementations, the code for sending 942 of FIG. 9 is executed to perform the operations of block 1004 and/or other similar operations as taught herein.

At block 1006, the apparatus sends a scheduling indication for the first carrier to the other apparatus via a second carrier (e.g., via an interface that can communicate via the second carrier). In some aspects, the scheduling indication may include a grant for a physical downlink shared channel (PDSCH). In some aspects, the scheduling indication may include a grant for a physical uplink shared channel (PUSCH). In some aspects, the first carrier may be a secondary component carrier (SCC). In some aspects, the second carrier may be a primary component carrier (PCC).

In some implementations, the circuit/module for sending 922 of FIG. 9 performs the operations of block 1006 and/or other similar operations as taught herein. In some implementations, the code for sending 942 of FIG. 9 is executed to perform the operations of block 1006 and/or other similar operations as taught herein.

At block 1008, the apparatus determines another communication configuration based on the default communication configuration. In some aspects, the other communication configuration may be for transmitting data on the PDSCH. In some aspects, the other communication configuration may be for receiving data on the PUSCH.

In some implementations, the circuit/module for determining a communication configuration 920 of FIG. 9 performs the operations of block 1008 and/or other similar operations as taught herein. In some implementations, the code for determining a communication configuration 940 of FIG. 9 is executed to perform the operations of block 1008 and/or other similar operations as taught herein.

At block 1010, the apparatus communicates information (e.g., via an interface) via the first carrier according to the scheduling indication, wherein the communication of the information may be based on the other communication configuration. For example, beam settings, etc., may be based on the specified CORESET.

In some implementations, the circuit/module for communicating 924 of FIG. 9 performs the operations of block 1010 and/or other similar operations as taught herein. In some implementations, the code for communicating 944 of FIG. 9 is executed to perform the operations of block 1010 and/or other similar operations as taught herein.

In some aspects, a process in accordance with the teachings herein may include any combination of the above operations.

Second Example Process

Figure 11:
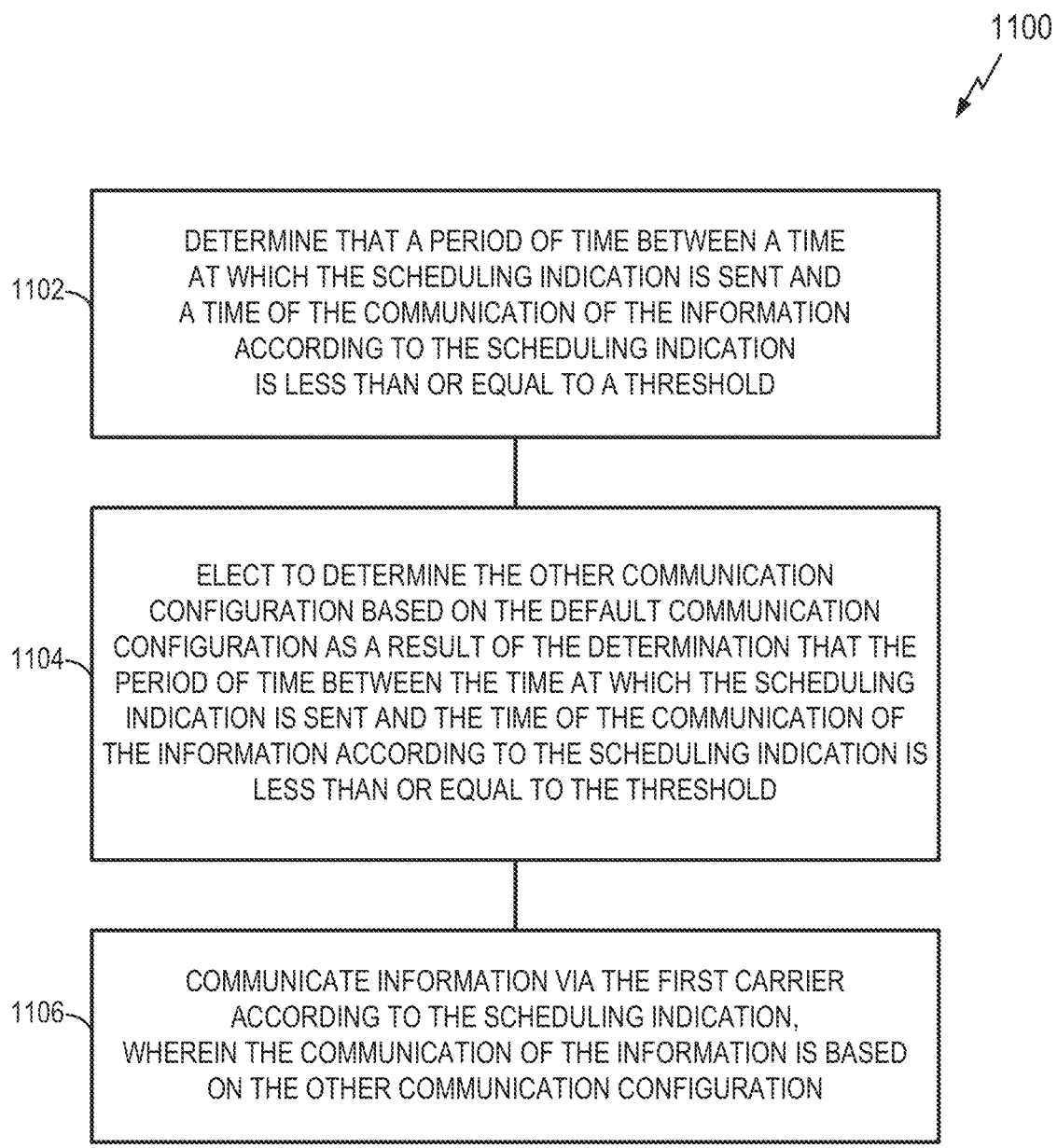
FIG. 11 is a flowchart illustrating an example of a communication process for determining a communication configuration in accordance with some aspects of the disclosure.

FIG. 11 illustrates a process 1100 for communication in accordance with some aspects of the disclosure. In some aspects, the process 1100 may be performed in conjunction with (e.g., as part of or in addition to) the process 1000 of FIG. 10. The process 1100 may take place within a processing circuit (e.g., the processing circuit 910 of FIG. 9), which may be located in a gNB, a TRP, a BS, an eNB, a CPE, or some other suitable apparatus. In some aspects, the process 1100 may be performed by the 5G cell 106 of FIG. 1, the first apparatus 502 of FIG. 5, or some other similar apparatus. Of course, in various aspects within the scope of the disclosure, the process 1100 may be implemented by any suitable apparatus capable of supporting communication-related operations.

At block 1102, an apparatus (e.g., a gNB) determines that a period of time between a time at which the scheduling indication is sent (e.g., the time of transmission of the scheduling indication at block 1006) and a time of the communication of the information according to the scheduling indication (e.g., at block 1010) is less than or equal to a threshold.

In some implementations, the circuit/module for determining that a period of time is less than or equal to a threshold 926 of FIG. 9 performs the operations of block 1102 and/or other similar operations as taught herein. In some implementations, the code for determining that a period of time is less than or equal to a threshold 946 of FIG. 9 is executed to perform the operations of block 1102 and/or other similar operations as taught herein.

At block 1104, the apparatus elects to determine the other communication configuration (e.g., at block 1008) based on the default communication configuration. In some aspects, the determination of block 1104 may be a result of the determination at block 1102 that the period of time between the time at which the scheduling indication is sent and the time of the communication of the information according to the scheduling indication is less than or equal to the threshold. For example, if the period of time is too short, the apparatus may select the other communication configuration.

In some implementations, the circuit/module for electing 928 of FIG. 9 performs the operations of block 1104 and/or other similar operations as taught herein. In some implementations, the code for electing 948 of FIG. 9 is executed to perform the operations of block 1104 and/or other similar operations as taught herein.

At block 1106, the apparatus communicates information (e.g., via an interface) via the first carrier according to the scheduling indication. In some aspects, the communication of the information may be based on the other communication configuration.

In some implementations, the circuit/module for communicating 924 of FIG. 9 performs the operations of block 1106 and/or other similar operations as taught herein. In some implementations, the code for communicating 944 of FIG. 9 is executed to perform the operations of block 1106 and/or other similar operations as taught herein.

In some aspects, a process in accordance with the teachings herein may include any combination of the above operations.

Third Example Process

Figure 12:
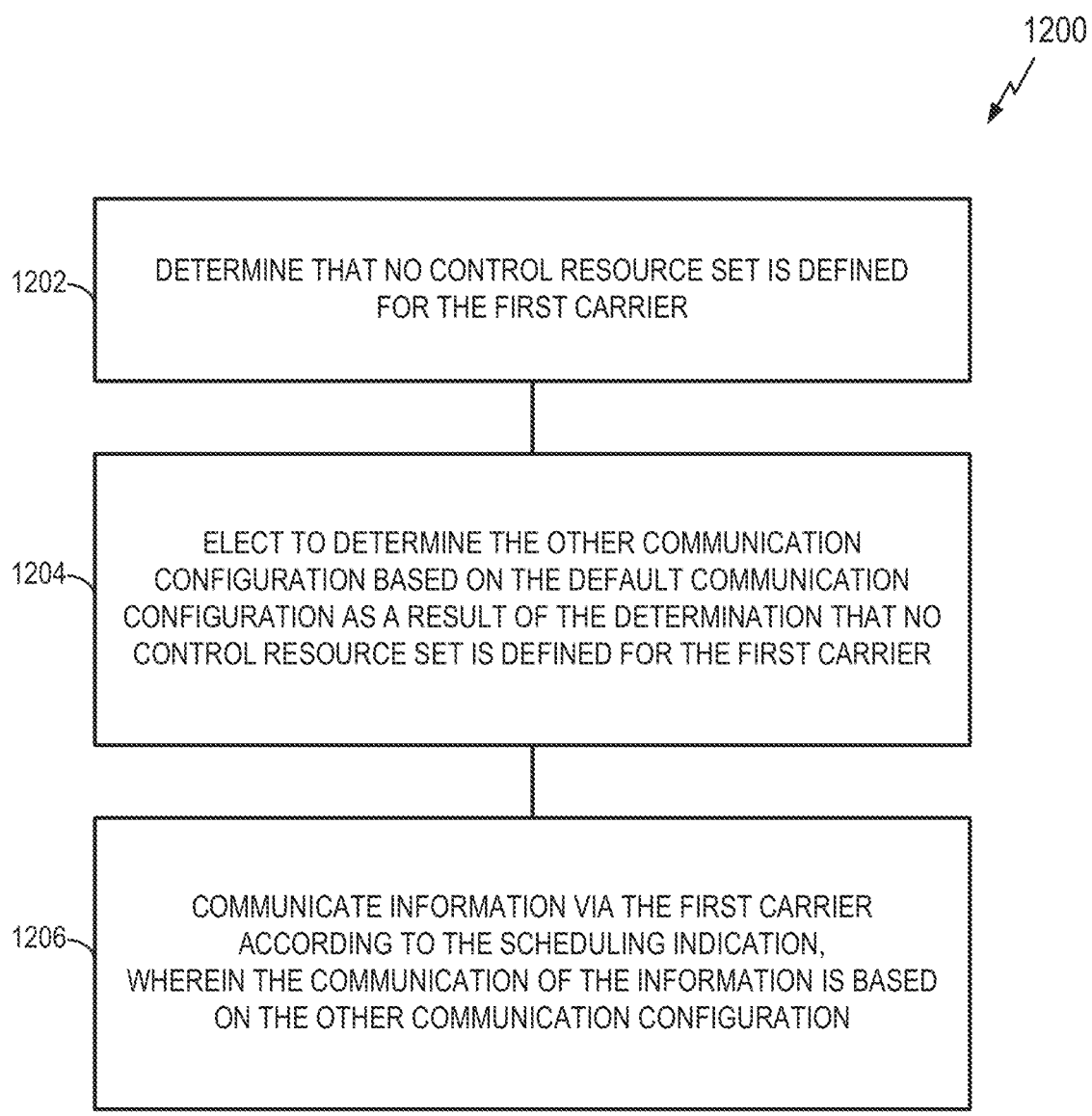
FIG. 12 is a flowchart illustrating another example of a communication process for determining a communication configuration in accordance with some aspects of the disclosure.

FIG. 12 illustrates a process 1200 for communication in accordance with some aspects of the disclosure. In some aspects, the process 1200 may be performed in conjunction with (e.g., as part of or in addition to) the process 1000 of FIG. 10. The process 1200 may take place within a processing circuit (e.g., the processing circuit 910 of FIG. 9), which may be located in a gNB, a TRP, a BS, an eNB, a CPE, or some other suitable apparatus. In some aspects, the process 1200 may be performed by the 5G cell 106 of FIG. 1, the first apparatus 502 of FIG. 5, or some other similar apparatus. Of course, in various aspects within the scope of the disclosure, the process 1200 may be implemented by any suitable apparatus capable of supporting communication-related operations.

At block 1202, an apparatus (e.g., a gNB) determines that no control resource set is defined for the first carrier. For example, a gNB may determine that there is no CORESET defined for an SCC.

In some implementations, the circuit/module for determining that no control resource set is defined 930 of FIG. 9 performs the operations of block 1202 and/or other similar operations as taught herein. In some implementations, the code for determining that that no control resource set is defined 950 of FIG. 9 is executed to perform the operations of block 1202 and/or other similar operations as taught herein.

At block 1204, the apparatus elects to determine the other communication configuration (e.g., at block 1008) based on the default communication configuration. In some aspects, the determination of block 1204 may be a result of the determination at block 1202 that no control resource set is defined for the first carrier. For example, if a CORESET is not defined, the apparatus may select the other communication configuration.

In some implementations, the circuit/module for electing 928 of FIG. 9 performs the operations of block 1204 and/or other similar operations as taught herein. In some implementations, the code for electing 948 of FIG. 9 is executed to perform the operations of block 1204 and/or other similar operations as taught herein.

At block 1206, the apparatus communicates information (e.g., via an interface) via the first carrier according to the scheduling indication. In some aspects, the communication of the information may be based on the other communication configuration.

In some implementations, the circuit/module for communicating 924 of FIG. 9 performs the operations of block 1206 and/or other similar operations as taught herein. In some implementations, the code for communicating 944 of FIG. 9 is executed to perform the operations of block 1206 and/or other similar operations as taught herein.

In some aspects, a process in accordance with the teachings herein may include any combination of the above operations.

Second Example Apparatus

Figure 13:
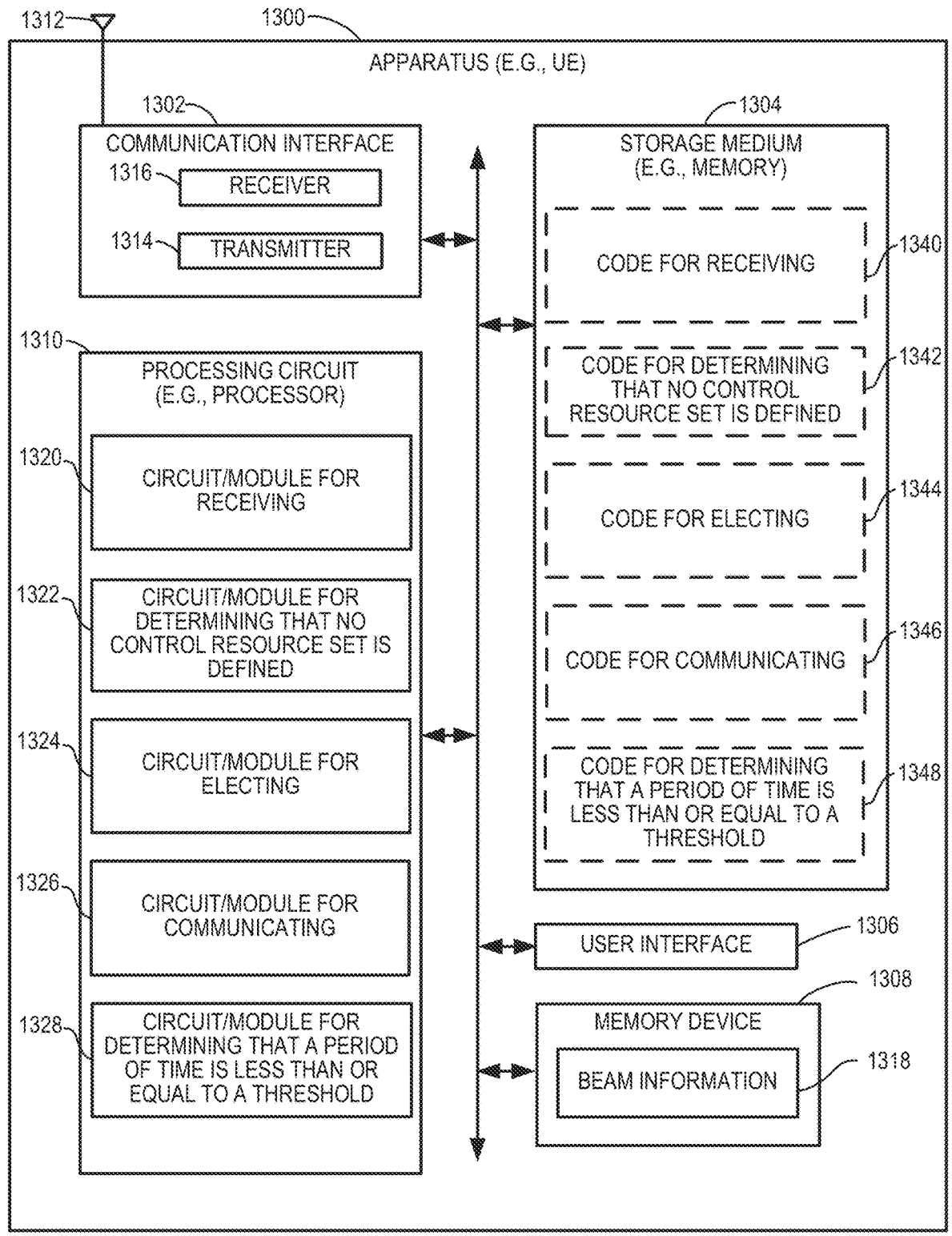
FIG. 13 is a block diagram illustrating an example hardware implementation for another apparatus (e.g., an electronic device) that can support communication in accordance with some aspects of the disclosure.

FIG. 13 illustrates a block diagram of an example hardware implementation of an apparatus 1300 configured to communicate according to one or more aspects of the disclosure. The apparatus 1300 could embody or be implemented within a UE, a gNB, a transmit receive point (TRP), a base station (BS), an eNode B (eNB), a CPE, or some other type of device that supports wireless communication. In various implementations, the apparatus 1300 could embody or be implemented within an access terminal, an access point, or some other type of device. In various implementations, the apparatus 1300 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 1300 includes a communication interface 1302 (e.g., at least one transceiver), a storage medium 1304, a user interface 1306, a memory device 1308 (e.g., storing beam information 1318), and a processing circuit 1310 (e.g., at least one processor). In various implementations, the user interface 1306 may include one or more of: a keypad, a display, a speaker, a microphone, a touchscreen display, of some other circuitry for receiving an input from or sending an output to a user. The communication interface 1302 may be coupled to one or more antennas 1312, and may include a transmitter 1314 and a receiver 1316. In general, the components of FIG. 13 may be similar to corresponding components of the apparatus 900 of FIG. 9.

According to one or more aspects of the disclosure, the processing circuit 1310 may be adapted to perform any or all of the features, processes, functions, operations and/or routines for any or all of the apparatuses described herein. For example, the processing circuit 1310 may be configured to perform any of the steps, functions, and/or processes described with respect to FIGS. 1-8, 14, and 15. As used herein, the term "adapted" in relation to the processing circuit 1310 may refer to the processing circuit 1310 being one or more of configured, used, implemented, and/or programmed to perform a particular process, function, operation and/or routine according to various features described herein.

The processing circuit 1310 may be a specialized processor, such as an application specific integrated circuit (ASIC) that serves as a means for (e.g., structure for) carrying out any one of the operations described in conjunction with FIGS. 1-8, 14, and 15. The processing circuit 1310 may serve as one example of a means for transmitting and/or a means for receiving. In various implementations, the processing circuit 1310 may provide and/or incorporate, at least in part, the functionality described above for the second apparatus 504 (e.g., the beam controller 514) of FIG. 5.

According to at least one example of the apparatus 1300, the processing circuit 1310 may include one or more of a circuit/module for receiving 1320, a circuit/module for determining that no control resource set is defined 1322, a circuit/module for electing 1324, a circuit/module for communicating 1326, or a circuit/module for determining that a period of time is less than or equal to a threshold 1328. In various implementations, the circuit/module for receiving 1320, the circuit/module for determining that no control resource set is defined 1322, the circuit/module for electing 1324, the circuit/module for communicating 1326, or the circuit/module for determining that a period of time is less than or equal to a threshold 1328 may provide and/or incorporate, at least in part, the functionality described above for the second apparatus 504 (e.g., the beam controller 514) of FIG. 5.

As mentioned above, programming stored by the storage medium 1304, when executed by the processing circuit 1310, causes the processing circuit 1310 to perform one or more of the various functions and/or process operations described herein. For example, the programming may cause the processing circuit 1310 to perform the various functions, steps, and/or processes described herein with respect to FIGS. 1-8, 14, and 15 in various implementations. As shown in FIG. 13, the storage medium 1304 may include one or more of code for receiving 1340, code for determining that no control resource set is defined 1342, code for electing 1344, code for communicating 1346, or code for determining that a period of time is less than or equal to a threshold 1348. In various implementations, the code for receiving 1340, the code for determining that no control resource set is defined 1342, the code for electing 1344, the code for communicating 1346, or the code for determining that a period of time is less than or equal to a threshold 1348 may be executed or otherwise used to provide the functionality described herein for the circuit/module for receiving 1320, the circuit/module for determining that no control resource set is defined 1322, the circuit/module for electing 1324, the circuit/module for communicating 1326, or the circuit/module for determining that a period of time is less than or equal to a threshold 1328.

The circuit/module for receiving 1320 may include circuitry and/or programming (e.g., code for receiving 1340 stored on the storage medium 1304) adapted to perform several functions relating to, for example, receiving information. In some scenarios, the circuit/module for receiving 1320 may obtain information (e.g., from the communication interface 1302, the memory device, or some other component of the apparatus 1300) and processes (e.g., decodes) the information. In some scenarios (e.g., if the circuit/module for receiving 1320 is or includes an RF receiver), the circuit/module for receiving 1320 may receive information directly from a device that transmitted the information. In either case, the circuit/module for receiving 1320 may output the obtained information to another component of the apparatus 1300 (e.g., the memory device 1308, or some other component).

The circuit/module for receiving 1320 (e.g., a means for receiving) may take various forms. In some aspects, the circuit/module for receiving 1320 may correspond to, for example, an interface (e.g., a bus interface, a send/receive interface, or some other type of signal interface), a communication device, a transceiver, a receiver, or some other similar component as discussed herein. In some implementations, the communication interface 1302 includes the circuit/module for receiving 1320 and/or the code for receiving 1340. In some implementations, the circuit/module for receiving 1320 and/or the code for receiving 1340 is configured to control the communication interface 1302 (e.g., a transceiver or a receiver) to receive information.

The circuit/module for determining that no control resource set is defined 1322 may include circuitry and/or programming (e.g., code for determining that no control resource set is defined 1342 stored on the storage medium 1304) adapted to perform several functions relating to, for example, checking a current configuration for a carrier to identify resources assigned for the carrier as discussed herein. In some aspects, the circuit/module for determining that no control resource set is defined 1322 (e.g., a means for determining that no control resource set is defined) may correspond to, for example, a processing circuit.

The circuit/module for electing 1324 may include circuitry and/or programming (e.g., code for electing 1344 stored on the storage medium 1304) adapted to perform several functions relating to, for example, electing to determine another communication configuration based on a default communication configuration as discussed herein (e.g., where the election is triggered based on one or more criterion as discussed herein). In some aspects, the circuit/module for electing 1324 (e.g., a means for electing) may correspond to, for example, a processing circuit.

The circuit/module for communicating 1326 may include circuitry and/or programming (e.g., code for communicating 1346 stored on the storage medium 1304) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1326 may communicate a message. In some aspects, the circuit/module for communicating 1326 may communicate an indication.

In some implementations where the communicating involves receiving information, the circuit/module for communicating 1326 receives information (e.g., from the communication interface 1302, the receiver 1316, the memory device 1308, some other component of the apparatus 1300, or some other device), processes (e.g., decodes) the information, and outputs the information to another component of the apparatus 1300 (e.g., the memory device 1308 or some other component). In some scenarios (e.g., if the circuit/module for communicating 1326 includes a receiver), the communicating involves the circuit/module for communicating 1326 receiving information directly from a device that transmitted the information (e.g., via radio frequency signaling or some other type of signaling suitable for the applicable communication medium).

In some implementations where the communicating involves sending information, the circuit/module for communicating 1326 obtains information (e.g., from the memory device 1308 or some other component of the apparatus 1300), processes (e.g., encodes) the information, and outputs the processed information. In some scenarios, the communicating involves sending the information to another component of the apparatus 1300 (e.g., the transmitter 1314, the communication interface 1302, or some other component) that will transmit the information to another device. In some scenarios (e.g., if the circuit/module for communicating 1326 includes a transmitter), the communicating involves the circuit/module for communicating 1326 transmitting the information directly to another device (e.g., the ultimate destination) via radio frequency signaling or some other type of signaling suitable for the applicable communication medium.

The circuit/module for communicating 1326 (e.g., a means for communicating) may take various forms. In some aspects, the circuit/module for communicating 1324 may correspond to, for example, an interface (e.g., a bus interface, a send/receive interface, or some other type of signal interface), a communication device, a transceiver, a transmitter, a receiver, or some other similar component as discussed herein. In some implementations, the communication interface 1302 includes the circuit/module for communicating 1326 and/or the code for communicating 1346. In some implementations, the circuit/module for communicating 1326 and/or the code for communicating 1346 is configured to control the communication interface 1302 (e.g., a transceiver, a receiver, or a transmitter) to communicate the information.

The circuit/module for determining that a period of time is less than or equal to a threshold 1328 may include circuitry and/or programming (e.g., code for determining that a period of time is less than or equal to a threshold 1348 stored on the storage medium 1304) adapted to perform several functions relating to, for example, comparing a period of time to a threshold and outputting an indication thereof as discussed herein. In some aspects, the circuit/module for determining that a period of time is less than or equal to a threshold 1328 (e.g., a means for determining that a period of time is less than or equal to a threshold) may correspond to, for example, a processing circuit.

Fourth Example Process

Figure 14:
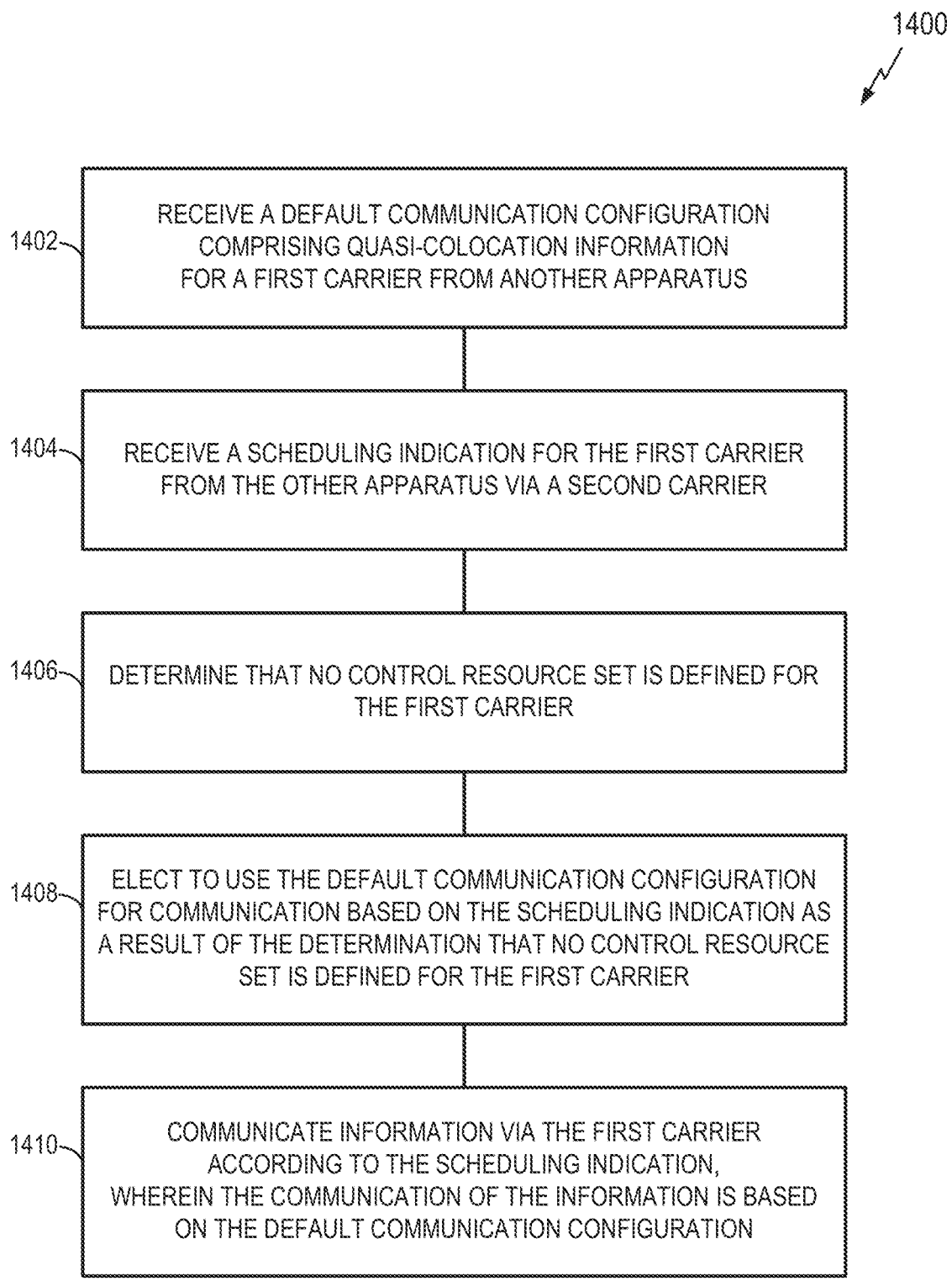
FIG. 14 is a flowchart illustrating another example of a communication process using configuration information in accordance with some aspects of the disclosure.
Figure 15:
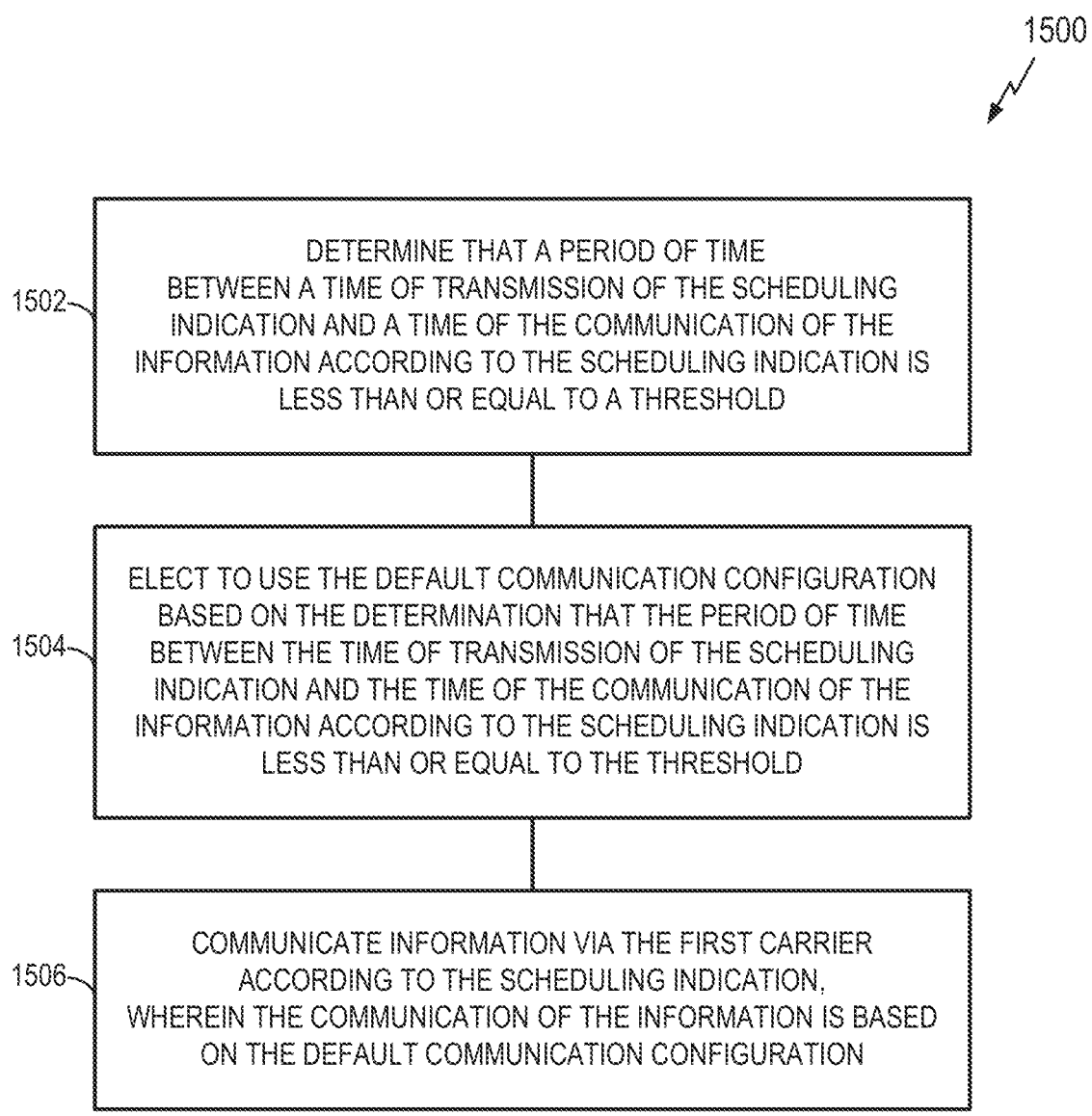
FIG. 15 is a flowchart illustrating another example of a communication process for determining a communication configuration in accordance with some aspects of the disclosure.

FIG. 14 illustrates a process 1400 for communication in accordance with some aspects of the disclosure. The process 1400 may take place within a processing circuit (e.g., the processing circuit 1310 of FIG. 13), which may be located in a UE, a gNB, a TRP, a BS, an eNB, a CPE, or some other suitable apparatus. In some aspects, the process 1400 may be performed by the UE 102 or the UE 104 of FIG. 1, the second apparatus 504 of FIG. 5, or some other similar apparatus. Of course, in various aspects within the scope of the disclosure, the process 1400 may be implemented by any suitable apparatus capable of supporting communication-related operations.

At block 1402, an apparatus (e.g., a UE) receives a default communication configuration comprising quasi-colocation information for a first carrier from another apparatus (e.g., via an interface). For example, a UE may receive a default CORESET configuration from a gNB.

The default communication configuration may take different forms in different implementations or scenarios. In some aspects, the default communication configuration may be for receiving data on the PDSCH. In some aspects, the default communication configuration may be for transmitting data on the PUSCH. In some aspects, the default communication configuration may include beam information. In some aspects, the default communication configuration may include at least one of: a filter, a Doppler shift, a Doppler spread, an average delay, a delay spread, a spatial receive parameter, or any combination thereof. In some aspects, the default communication configuration may include default quasi-colocation information for the first carrier. In some aspects, the default communication configuration may include a default quasi-colocation information pattern for the first carrier.

In some implementations, the circuit/module for receiving 1320 of FIG. 13 performs the operations of block 1402 and/or other similar operations as taught herein. In some implementations, the code for receiving 1340 of FIG. 13 is executed to perform the operations of block 1402 and/or other similar operations as taught herein.

At block 1404, the apparatus receives a scheduling indication for the first carrier from the other apparatus via a second carrier (e.g., via an interface). For example, a UE may receive a grant from a gNB. In some aspects, the scheduling indication may include a grant for a physical downlink shared channel (PDSCH). In some aspects, the scheduling indication may include a grant for a physical uplink shared channel (PUSCH). In some aspects, the first carrier may be a secondary component carrier (SCC). In some aspects, the second carrier may be a primary component carrier (PCC).

In some implementations, the circuit/module for receiving 1320 of FIG. 13 performs the operations of block 1404 and/or other similar operations as taught herein. In some implementations, the code for receiving 1340 of FIG. 13 is executed to perform the operations of block 1404 and/or other similar operations as taught herein.

At block 1406, the apparatus determines that no control resource set is defined for the first carrier. For example, a UE may determine that there is no CORESET defined for an SCC.

In some implementations, the circuit/module for determining that no control resource set is defined 1322 of FIG. 13 performs the operations of block 1406 and/or other similar operations as taught herein. In some implementations, the code for determining that that no control resource set is defined 1342 of FIG. 13 is executed to perform the operations of block 1406 and/or other similar operations as taught herein.

At block 1408, the apparatus elects to use the default communication configuration for communication based on the scheduling indication as a result of the determination that no control resource set is defined for the first carrier.

In some aspects, the default communication configuration may include a default control resource set configuration. In some aspects, the election to use the default communication configuration may be based on a determination that the default control resource set configuration does not specify any frequency and time resources.

In some aspects, the default communication configuration may include a virtual search space configuration. In some aspects, the election to use the default communication configuration may be based on a determination that the virtual search space configuration does not specify any aggregation levels.

In some implementations, the circuit/module for electing 1324 of FIG. 13 performs the operations of block 1408 and/or other similar operations as taught herein. In some implementations, the code for electing 1344 of FIG. 13 is executed to perform the operations of block 1408 and/or other similar operations as taught herein.

At block 1410, the apparatus communicates information (e.g., via an interface) via the first carrier according to the scheduling indication. In some aspects, the communication of the information may be based on the default communication configuration. For example, beam settings, etc., may be based on the default CORESET.

In some implementations, the circuit/module for communicating 1326 of FIG. 13 performs the operations of block 1410 and/or other similar operations as taught herein. In some implementations, the code for communicating 1346 of FIG. 13 is executed to perform the operations of block 1410 and/or other similar operations as taught herein.

In some aspects, the process 1400 may include determining that a period of time between a time of transmission of the scheduling indication and a time of the communication of the information according to the scheduling indication is less than or equal to a threshold. In this case, the election to use the default communication configuration may be based on the determination that the period of time between the time of transmission of the scheduling indication and the time of the communication of the information according to the scheduling indication is less than or equal to the threshold.

In some aspects, a process in accordance with the teachings herein may include any combination of the above operations.

Fifth Example Process

FIG. 14 illustrates a process 1500 for communication in accordance with some aspects of the disclosure. In some aspects, the process 1500 may be performed in conjunction with (e.g., as part of or in addition to) the process 1400 of FIG. 14. The process 1500 may take place within a processing circuit (e.g., the processing circuit 1310 of FIG. 13), which may be located in a UE, a gNB, a TRP, a BS, an eNB, a CPE, or some other suitable apparatus. In some aspects, the process 1500 may be performed by the UE 102 or the UE 104 of FIG. 1, the second apparatus 504 of FIG. 5, or some other similar apparatus. Of course, in various aspects within the scope of the disclosure, the process 1500 may be implemented by any suitable apparatus capable of supporting communication-related operations.

At block 1502, an apparatus (e.g., a UE) determines that a period of time between a time of transmission of the scheduling indication (e.g., the scheduling indication received at block 1404) and a time of the communication of the information according to the scheduling indication (e.g., the communication of block 1410) is less than or equal to a threshold.

In some implementations, the circuit/module for determining that a period of time is less than or equal to a threshold 1328 of FIG. 13 performs the operations of block 1502 and/or other similar operations as taught herein. In some implementations, the code for determining that a period of time is less than or equal to a threshold 1348 of FIG. 13 is executed to perform the operations of block 1502 and/or other similar operations as taught herein.

At block 1504, the apparatus elects to use the default communication configuration (e.g., received at block 1402). In some aspects, the election of block 1506 may be based on the determination at block 1502 that the period of time between the time of transmission of the scheduling indication and the time of the communication of the information according to the scheduling indication is less than or equal to the threshold.

In some implementations, the circuit/module for electing 1324 of FIG. 13 performs the operations of block 1504 and/or other similar operations as taught herein. In some implementations, the code for electing 1344 of FIG. 13 is executed to perform the operations of block 1504 and/or other similar operations as taught herein.

At block 1506, the apparatus communicates information (e.g., via an interface) via the first carrier according to the scheduling indication. In some aspects, the communication of the information is based on the default communication configuration.

In some implementations, the circuit/module for communicating 1326 of FIG. 13 performs the operations of block 1506 and/or other similar operations as taught herein. In some implementations, the code for communicating 1346 of FIG. 13 is executed to perform the operations of block 1506 and/or other similar operations as taught herein.

In some aspects, a process in accordance with the teachings herein may include any combination of the above operations.

Third Example Apparatus

Figure 16:
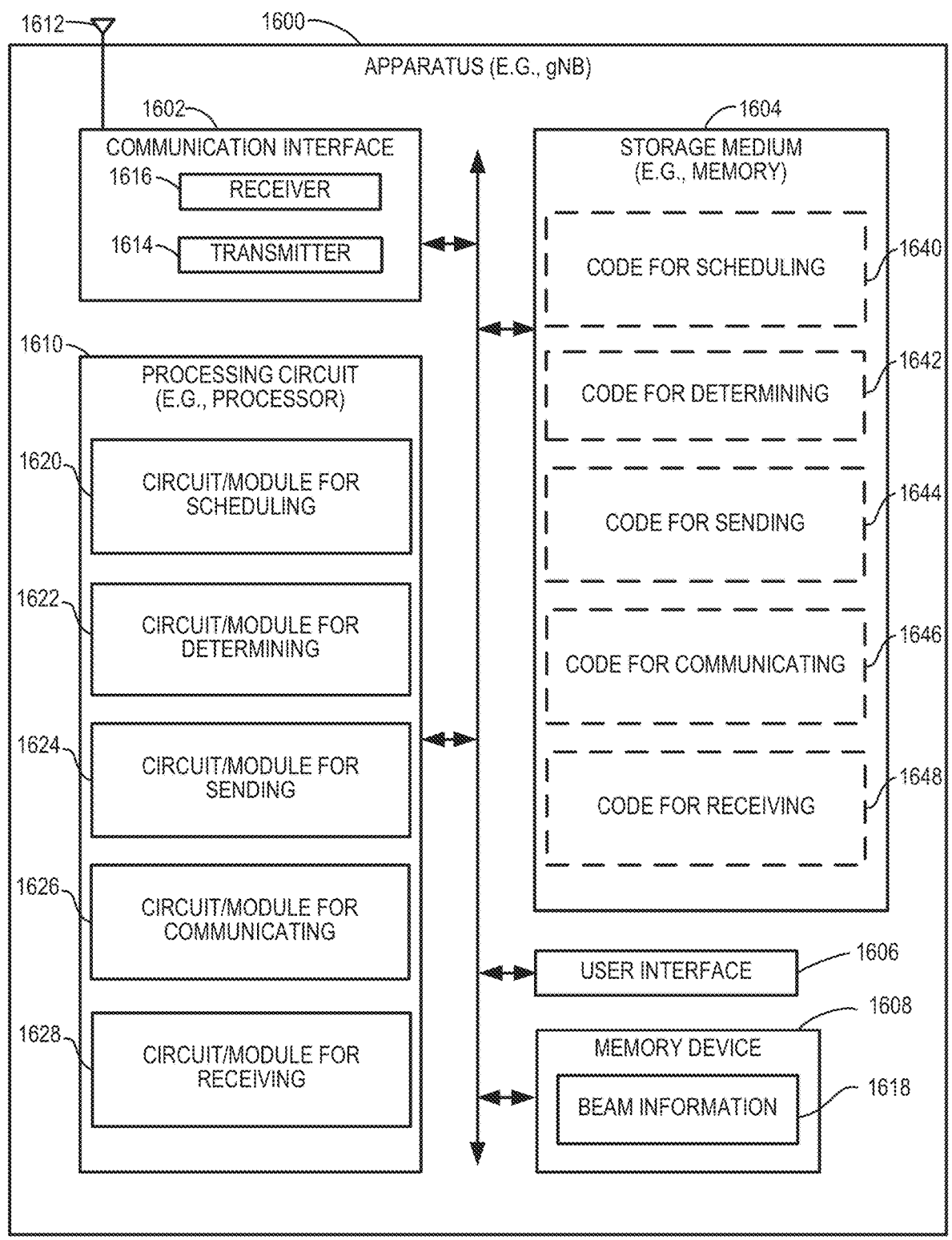
FIG. 16 is a block diagram illustrating an example hardware implementation for another apparatus (e.g., an electronic device) that can support communication in accordance with some aspects of the disclosure.

FIG. 16 illustrates a block diagram of an example hardware implementation of an apparatus 1600 configured to communicate according to one or more aspects of the disclosure. The apparatus 1600 could embody or be implemented within a gNB, a transmit receive point (TRP), a base station (BS), an eNode B (eNB), a CPE, or some other type of device that supports wireless communication. In various implementations, the apparatus 1600 could embody or be implemented within an access terminal, an access point, or some other type of device. In various implementations, the apparatus 1600 could embody or be implemented within a server, a personal computer, a mobile phone, a smart phone, a tablet, a portable computer, a sensor, an alarm, a vehicle, a machine, an entertainment device, a medical device, or any other electronic device having circuitry.

The apparatus 1600 includes a communication interface 1602 (e.g., at least one transceiver), a storage medium 1604, a user interface 1606, a memory device 1608 (e.g., storing beam information 1618), and a processing circuit 1610 (e.g., at least one processor). In various implementations, the user interface 1606 may include one or more of: a keypad, a display, a speaker, a microphone, a touchscreen display, of some other circuitry for receiving an input from or sending an output to a user. The communication interface 1602 may be coupled to one or more antennas 1612, and may include a transmitter 1614 and a receiver 1616. In general, the components of FIG. 16 may be similar to corresponding components of the apparatus 900 of FIG. 9.

According to one or more aspects of the disclosure, the processing circuit 1610 may be adapted to perform any or all of the features, processes, functions, operations and/or routines for any or all of the apparatuses described herein. For example, the processing circuit 1610 may be configured to perform any of the steps, functions, and/or processes described with respect to FIGS. 1-8 and 17. As used herein, the term "adapted" in relation to the processing circuit 1610 may refer to the processing circuit 1610 being one or more of configured, used, implemented, and/or programmed to perform a particular process, function, operation and/or routine according to various features described herein.

The processing circuit 1610 may be a specialized processor, such as an application specific integrated circuit (ASIC) that serves as a means for (e.g., structure for) carrying out any one of the operations described in conjunction with FIGS. 1-8 and 17. The processing circuit 1610 may serve as one example of a means for transmitting and/or a means for receiving. In various implementations, the processing circuit 1610 may provide and/or incorporate, at least in part, the functionality described above for the first apparatus 502 (e.g., the scheduler 506 and/or the beam controller 514) of FIG. 5.

According to at least one example of the apparatus 1600, the processing circuit 1610 may include one or more of a circuit/module for scheduling 1620, a circuit/module for determining 1622, a circuit/module for sending 1624, a circuit/module for communicating 1626, or a circuit/module for receiving 1628. In various implementations, the circuit/module for scheduling 1620, the circuit/module for determining 1622, the circuit/module for sending 1624, the circuit/module for communicating 1626, or the circuit/module for receiving 1628 may provide and/or incorporate, at least in part, the functionality described above for the first apparatus 502 (e.g., the scheduler 506 and/or the beam controller 514) of FIG. 5.

As mentioned above, programming stored by the storage medium 1604, when executed by the processing circuit 1610, causes the processing circuit 1610 to perform one or more of the various functions and/or process operations described herein. For example, the programming may cause the processing circuit 1610 to perform the various functions, steps, and/or processes described herein with respect to FIGS. 1-8 and 17 in various implementations. As shown in FIG. 16, the storage medium 1604 may include one or more of code for scheduling 1640, code for determining 1642, code for sending 1644, code for communicating 1646, or code for receiving 1648. In various implementations, the code for scheduling 1640, the code for determining 1642, the code for sending 1644, the code for communicating 1646, or the code for receiving 1648 may be executed or otherwise used to provide the functionality described herein for the circuit/module for scheduling 1620, the circuit/module for determining 1622, the circuit/module for sending 1624, the circuit/module for communicating 1626, or the circuit/module for receiving 1628.

The circuit/module for scheduling 1620 may include circuitry and/or programming (e.g., code for scheduling 1640 stored on the storage medium 1604) adapted to perform several functions relating to, for example, scheduling communication. In some aspects, the circuit/module for scheduling 1620 may generate a grant or other scheduling information as discussed herein. In some aspects, the circuit/module for scheduling 1620 (e.g., a means for scheduling) may correspond to, for example, a processing circuit.

The circuit/module for determining 1622 may include circuitry and/or programming (e.g., code for determining 1642 stored on the storage medium 1604) adapted to perform several functions relating to, for example, determining information and/or a condition as discussed herein. In some aspects, the circuit/module for determining 1622 may determine a default communication configuration (e.g., a default CORESET) or another communication configuration (e.g., CORESET configuration) as discussed herein. In some aspects, the circuit/module for determining 1622 (e.g., a means for determining) may correspond to, for example, a processing circuit.

The circuit/module for sending 1624 may include circuitry and/or programming (e.g., code for sending 1644 stored on the storage medium 1604) adapted to perform several functions relating to, for example, sending (e.g., transmitting) information. In some implementations, the circuit/module for sending 1624 may obtain information (e.g., from the memory device 1608, or some other component of the apparatus 1600), process the information (e.g., encode the information for transmission), and send the information to another component (e.g., the transmitter 1614, the communication interface 1602, or some other component) that will transmit the information to another device. In some scenarios (e.g., if the circuit/module for sending 1624 includes a transmitter), the circuit/module for sending 1624 transmits the information directly to another device (e.g., the ultimate destination) via radio frequency signaling or some other type of signaling suitable for the applicable communication medium.

The circuit/module for sending 1624 (e.g., a means for sending) may take various forms. In some aspects, the circuit/module for sending 1624 may correspond to, for example, an interface (e.g., a bus interface, a send/receive interface, or some other type of signal interface), a communication device, a transceiver, a transmitter, or some other similar component as discussed herein. In some implementations, the communication interface 1602 includes the circuit/module for sending 1624 and/or the code for sending 1644. In some implementations, the circuit/module for sending 1624 and/or the code for sending 1644 is configured to control the communication interface 1602 (e.g., a transceiver or a transmitter) to transmit information.

The circuit/module for communicating 1626 may include circuitry and/or programming (e.g., code for communicating 1646 stored on the storage medium 1604) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1626 may communicate a message. In some aspects, the circuit/module for communicating 1626 may communicate an indication.

In some implementations where the communicating involves receiving information, the circuit/module for communicating 1626 receives information (e.g., from the communication interface 1602, the receiver 1616, the memory device 1608, some other component of the apparatus 1600, or some other device), processes (e.g., decodes) the information, and outputs the information to another component of the apparatus 1600 (e.g., the memory device 1608 or some other component). In some scenarios (e.g., if the circuit/module for communicating 1626 includes a receiver), the communicating involves the circuit/module for communicating 1626 receiving information directly from a device that transmitted the information (e.g., via radio frequency signaling or some other type of signaling suitable for the applicable communication medium).

In some implementations where the communicating involves sending information, the circuit/module for communicating 1626 obtains information (e.g., from the memory device 1608 or some other component of the apparatus 1600), processes (e.g., encodes) the information, and outputs the processed information. In some scenarios, the communicating involves sending the information to another component of the apparatus 1600 (e.g., the transmitter 1614, the communication interface 1602, or some other component) that will transmit the information to another device. In some scenarios (e.g., if the circuit/module for communicating 1626 includes a transmitter), the communicating involves the circuit/module for communicating 1626 transmitting the information directly to another device (e.g., the ultimate destination) via radio frequency signaling or some other type of signaling suitable for the applicable communication medium.

The circuit/module for communicating 1626 (e.g., a means for communicating) may take various forms. In some aspects, the circuit/module for communicating 1626 may correspond to, for example, an interface (e.g., a bus interface, a send/receive interface, or some other type of signal interface), a communication device, a transceiver, a transmitter, a receiver, or some other similar component as discussed herein. In some implementations, the communication interface 1602 includes the circuit/module for communicating 1626 and/or the code for communicating 1646. In some implementations, the circuit/module for communicating 1626 and/or the code for communicating 1646 is configured to control the communication interface 1602 (e.g., a transceiver, a receiver, or a transmitter) to communicate the information.

The circuit/module for receiving 1628 may include circuitry and/or programming (e.g., code for receiving 1648 stored on the storage medium 1604) adapted to perform several functions relating to, for example, receiving information. In some scenarios, the circuit/module for receiving 1628 may obtain information (e.g., from the communication interface 1602, the memory device, or some other component of the apparatus 1600) and processes (e.g., decodes) the information. In some scenarios (e.g., if the circuit/module for receiving 1628 is or includes an RF receiver), the circuit/module for receiving 1628 may receive information directly from a device that transmitted the information. In either case, the circuit/module for receiving 1628 may output the obtained information to another component of the apparatus 1600 (e.g., the memory device 1608, or some other component).

The circuit/module for receiving 1628 (e.g., a means for receiving) may take various forms. In some aspects, the circuit/module for receiving 1628 may correspond to, for example, an interface (e.g., a bus interface, a send/receive interface, or some other type of signal interface), a communication device, a transceiver, a receiver, or some other similar component as discussed herein. In some implementations, the communication interface 1602 includes the circuit/module for receiving 1628 and/or the code for receiving 1648. In some implementations, the circuit/module for receiving 1628 and/or the code for receiving 1648 is configured to control the communication interface 1602 (e.g., a transceiver or a receiver) to receive information.

Sixth Example Process

Figure 17:
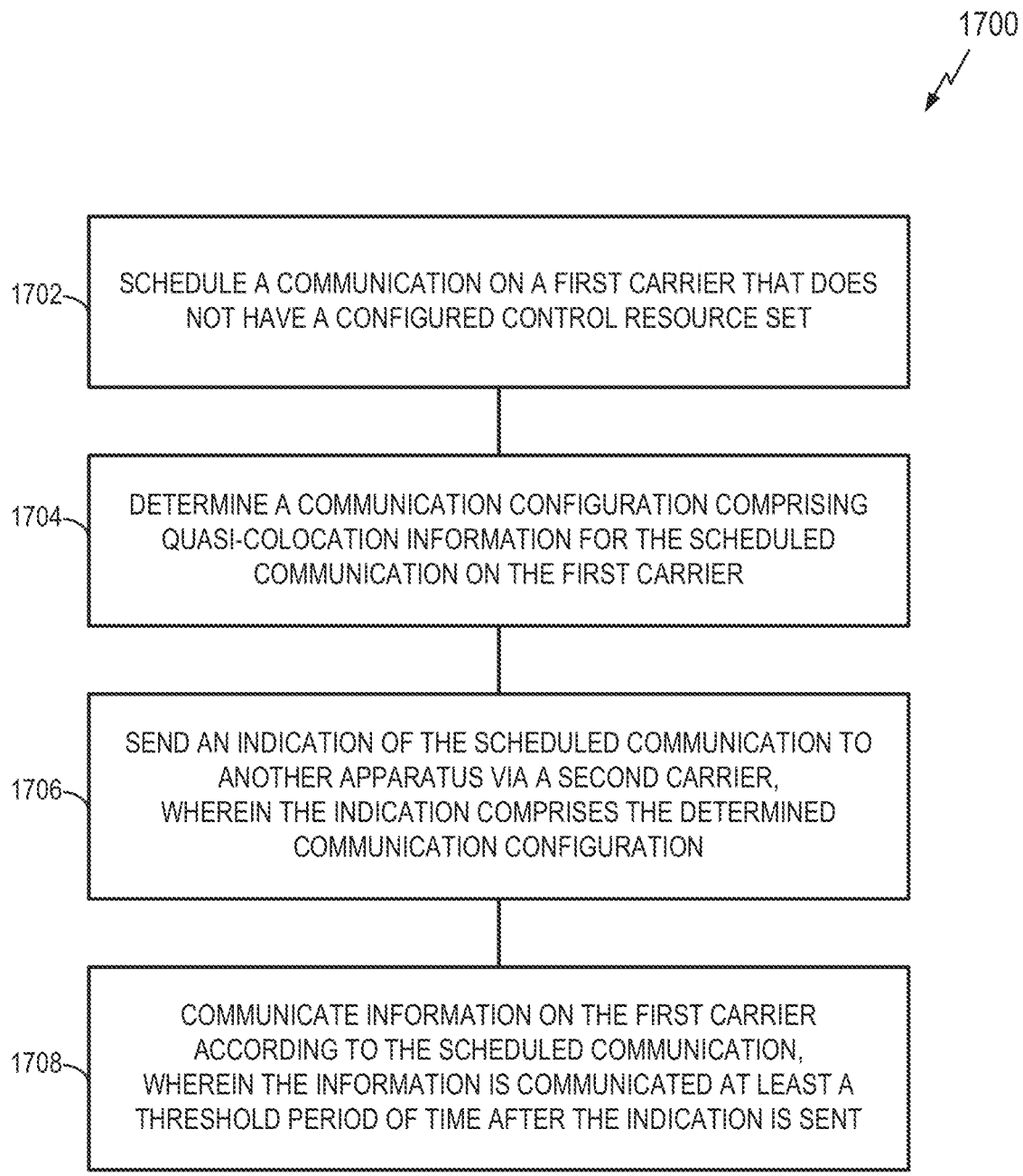
FIG. 17 is a flowchart illustrating an example of a communication process for providing configuration information in accordance with some aspects of the disclosure.

FIG. 17 illustrates a process 1700 for communication in accordance with some aspects of the disclosure. The process 1700 may take place within a processing circuit (e.g., the processing circuit 1610 of FIG. 16), which may be located in a gNB, a TRP, a BS, an eNB, a CPE, or some other suitable apparatus. In some aspects, the process 1700 may be performed by the 5G cell 106 of FIG. 1, the first apparatus 502 of FIG. 5, or some other similar apparatus. Of course, in various aspects within the scope of the disclosure, the process 1700 may be implemented by any suitable apparatus capable of supporting communication-related operations.

At block 1702, an apparatus (e.g., a gNB) schedules a communication on a first carrier that does not have a configured control resource set. In some aspects, the first carrier may be a secondary component carrier (SCC).

In some implementations, the circuit/module for scheduling 1620 of FIG. 16 performs the operations of block 1702 and/or other similar operations as taught herein. In some implementations, the code for scheduling 1640 of FIG. 16 is executed to perform the operations of block 1702 and/or other similar operations as taught herein.

At block 1704, the apparatus determines a communication configuration comprising quasi-colocation information for the scheduled communication on the first carrier. For example, a gNB may select a CORESET configuration for the communication.

In some implementations, the circuit/module for determining 1622 of FIG. 16 performs the operations of block 1704 and/or other similar operations as taught herein. In some implementations, the code for determining 1642 of FIG. 16 is executed to perform the operations of block 1704 and/or other similar operations as taught herein.

At block 1706, the apparatus sends an indication of the scheduled communication to another apparatus via a second carrier (e.g., via an interface), wherein the indication comprises the determined communication configuration. In some aspects, the indication may indicate that the communication of the information occurs at least a threshold period of time after the indication is sent. In some aspects, the indication may include Downlink Control Information; and the scheduled communication may include a Physical Downlink Shared Channel. In some aspects, the indication may include a grant for a physical downlink shared channel (PDSCH); and the scheduled communication may be for PDSCH data. In some aspects, the indication may include a grant for a physical uplink shared channel (PUSCH); and the scheduled communication may be for PUSCH data.

In some implementations, the circuit/module for sending 1624 of FIG. 16 performs the operations of block 1706 and/or other similar operations as taught herein. In some implementations, the code for sending 1644 of FIG. 16 is executed to perform the operations of block 1706 and/or other similar operations as taught herein.

At block 1708, the apparatus communicates information (e.g., via an interface) on the first carrier according to the scheduled communication, wherein the information is communicated at least a threshold period of time after the indication is sent. In some aspects, the threshold (e.g., the threshold period of time) may correspond to a processing time for the indication. In some aspects, the second carrier may be a primary component carrier (PCC).

In some implementations, the circuit/module for communicating 1626 of FIG. 16 performs the operations of block 1708 and/or other similar operations as taught herein. In some implementations, the code for communicating 1646 of FIG. 16 is executed to perform the operations of block 1708 and/or other similar operations as taught herein.

In some aspects, a process in accordance with the teachings herein may include any combination of the above operations.

Other Aspects

Any of the following aspects may be implemented independently and/or combined with other aspects or embodiments disclosed herein.

In one aspect, the disclosure provides an apparatus configured for communication that includes a processing circuit and an interface coupled to the processing circuit. The processing circuit is configured to: schedule a communication on a first carrier that does not have a configured control resource set; determine a communication configuration comprising quasi-colocation information for the scheduled communication on the first carrier; send an indication of the scheduled communication to another apparatus via a second carrier, wherein the indication comprises the determined communication configuration; and communicate information on the first carrier according to the scheduled communication, wherein the information is communicated at least a threshold period of time after the indication is sent.

In one aspect, the disclosure provides a method of communication for an apparatus. The method includes: scheduling a communication on a first carrier that does not have a configured control resource set; determining a communication configuration comprising quasi-colocation information for the scheduled communication on the first carrier; sending an indication of the scheduled communication to another apparatus via a second carrier, wherein the indication comprises the determined communication configuration; and communicating information on the first carrier according to the scheduled communication, wherein the information is communicated at least a threshold period of time after the indication is sent.

In one aspect, the disclosure provides an apparatus configured for communication. The apparatus includes: means for scheduling a communication on a first carrier that does not have a configured control resource set; means for determining a communication configuration comprising quasi-colocation information for the scheduled communication on the first carrier; means for sending an indication of the scheduled communication to another apparatus via a second carrier, wherein the indication comprises the determined communication configuration; and means for communicating information on the first carrier according to the scheduled communication, wherein the information is communicated at least a threshold period of time after the indication is sent.

In one aspect, the disclosure provides a non-transitory computer-readable medium storing computer-executable code, including code to: schedule a communication on a first carrier that does not have a configured control resource set; determine a communication configuration comprising quasi-colocation information for the scheduled communication on the first carrier; send an indication of the scheduled communication to another apparatus via a second carrier, wherein the indication comprises the determined communication configuration; and communicate information on the first carrier according to the scheduled communication, wherein the information is communicated at least a threshold period of time after the indication is sent.

In some aspects, the threshold corresponds to a processing time for the indication. In some aspects, the indication indicates that the communication of the information occurs at least a threshold period of time after the indication is sent. In some aspects, the indication comprises Downlink Control Information; and the scheduled communication comprise a Physical Downlink Shared Channel. In some aspects, the first carrier comprises a secondary component carrier; and the second carrier comprises a primary component carrier. In some aspects, the indication comprises a grant for a physical downlink shared channel (PDSCH); and the scheduled communication is for PDSCH data. In some aspects, the indication comprises a grant for a physical uplink shared channel (PUSCH); and the scheduled communication is for PUSCH data.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A base station, comprising:
an interface; and
a processing circuit coupled to the interface and configured to:
determine a default communication configuration comprising quasi-colocation information for a first carrier,
send the default communication configuration to a user equipment via the interface,
send a scheduling indication for the first carrier to the user equipment via a second carrier,
determine that no control resource set is defined for the first carrier,
determine another communication configuration based on the default communication configuration as a result of the determination that no control resource set is defined for the first carrier, and
communicate information via the first carrier according to the scheduling indication, wherein the communication of the information is based on the other communication configuration.

2. The base station of claim 1, wherein:
the first carrier comprises a secondary component carrier; and
the second carrier comprises a primary component carrier.

3. The base station of claim 1, wherein:
the scheduling indication comprises a grant for a physical downlink shared channel (PDSCH);
the default communication configuration is for receiving data on the PDSCH; and
the other communication configuration is for transmitting data on the PDSCH.

4. The base station of claim 1, wherein:
the scheduling indication comprises a grant for a physical uplink shared channel (PUSCH);
the default communication configuration is for transmitting data on the PUSCH; and
the other communication configuration is for receiving data on the PUSCH.

5. The base station of claim 1, wherein the default communication configuration comprises beam information.

6. The base station of claim 1, wherein the default communication configuration comprises at least one of: a filter, a Doppler shift, a Doppler spread, an average delay, a delay spread, a spatial receive parameter, or any combination thereof.

7. The base station of claim 1, wherein the default communication configuration comprises a default control resource set configuration.

8. The base station of claim 7, wherein the default control resource set configuration does not specify any frequency and time resources.

9. The base station of claim 1, wherein the default communication configuration comprises a virtual search space configuration.

10. The base station of claim 9, wherein the virtual search space configuration does not specify any aggregation levels.

11. The base station of claim 1, wherein the default communication configuration comprises default quasi-colocation information for the first carrier.

12. The base station of claim 1, wherein the default communication configuration comprises a default quasi-colocation information pattern for the first carrier.

13. The base station of claim 1, wherein the processing circuit is further configured to:
determine that a period of time between a time at which the scheduling indication is sent and a time of the communication of the information according to the scheduling indication is less than or equal to a threshold; and
elect to determine the other communication configuration based on the default communication configuration as a result of the determination that the period of time between the time at which the scheduling indication is sent and the time of the communication of the information according to the scheduling indication is less than or equal to the threshold.

14. A method of communication at a base station, comprising:
determining a default communication configuration comprising quasi-colocation information for a first carrier;
sending the default communication configuration to a user equipment;
sending a scheduling indication for the first carrier to the user equipment via a second carrier;
determining that no control resource set is defined for the first carrier;
determining another communication configuration based on the default communication configuration as a result of the determining that no control resource set is defined for the first carrier; and
communicating information via the first carrier according to the scheduling indication, wherein the communication of the information is based on the other communication configuration.

15. A user equipment, comprising:
an interface; and
a processing circuit coupled to the interface and configured to:
receive a default communication configuration comprising quasi-colocation information for a first carrier from a base station via the interface;
receive a scheduling indication for the first carrier from the base station via a second carrier;
determine that no control resource set is defined for the first carrier;
elect to use the default communication configuration for communication based on the scheduling indication as a result of the determination that no control resource set is defined for the first carrier; and
communicate information via the first carrier according to the scheduling indication, wherein the communication of the information is based on the default communication configuration.

16. The user equipment of claim 15, wherein:
the first carrier comprises a secondary component carrier; and
the second carrier comprises a primary component carrier.

17. The user equipment of claim 15, wherein:
the scheduling indication comprises a grant for a physical downlink shared channel (PDSCH); and the default communication configuration is for receiving data on the PDSCH.

18. The user equipment of claim 15, wherein:
the scheduling indication comprises a grant for a physical uplink shared channel (PUSCH); and
the default communication configuration is for transmitting data on the PUSCH.

19. The user equipment of claim 15, wherein the default communication configuration comprises beam information.

20. The user equipment of claim 15, wherein the default communication configuration comprises at least one of: a filter, a Doppler shift, a Doppler spread, an average delay, a delay spread, a spatial receive parameter, or any combination thereof.

21. The user equipment of claim 15, wherein the default communication configuration comprises a default control resource set configuration.

22. The user equipment of claim 21, wherein the election to use the default communication configuration is based on a determination that the default control resource set configuration does not specify any frequency and time resources.

23. The user equipment of claim 15, wherein the default communication configuration comprises a virtual search space configuration.

24. The user equipment of claim 23, wherein the election to use the default communication configuration is based on a determination that the virtual search space configuration does not specify any aggregation levels.

25. The user equipment of claim 15, wherein the default communication configuration comprises default quasi-colocation information for the first carrier.

26. The user equipment of claim 15, wherein the default communication configuration comprises a default quasi-colocation information pattern for the first carrier.

27. The user equipment of claim 15, wherein:
the processing circuit is further configured to determine that a period of time between a time of transmission of the scheduling indication and a time of the communication of the information according to the scheduling indication is less than or equal to a threshold; and
the election to use the default communication configuration is based on the determination that the period of time between the time of transmission of the scheduling indication and the time of the communication of the information according to the scheduling indication is less than or equal to the threshold.

28. A method of communication at a user equipment, comprising:
receiving a default communication configuration comprising quasi-colocation information for a first carrier from a base station;
receiving a scheduling indication for the first carrier from the base station via a second carrier;
determining that no control resource set is defined for the first carrier;
electing to use the default communication configuration for communication based on the scheduling indication as a result of the determining that no control resource set is defined for the first carrier; and
communicating information via the first carrier according to the scheduling indication, wherein the communication of the information is based on the default communication configuration.

29. The base station of claim 1, wherein the determination of another communication configuration based on the default communication configuration comprises:
determining a second communication configuration for transmitting a downlink transmission that is it compatible with the default communication configuration that is to be used by the user equipment for receiving the downlink transmission.

* * * * *